US011286884B2

(12) United States Patent
Boardman et al.

(10) Patent No.: US 11,286,884 B2
(45) Date of Patent: Mar. 29, 2022

(54) COMBUSTION SECTION AND FUEL INJECTOR ASSEMBLY FOR A HEAT ENGINE

(71) Applicant: General Electric Company, Schenectady, NY (US)

(72) Inventors: Gregory Allen Boardman, Liberty Township, OH (US); Pradeep Naik, Bangalore (IN); Clayton Stuart Cooper, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 208 days.

(21) Appl. No.: 16/217,625

(22) Filed: Dec. 12, 2018

(65) Prior Publication Data

US 2020/0191093 A1 Jun. 18, 2020

(51) Int. Cl.
*F23R 3/34* (2006.01)
*F02C 9/26* (2006.01)
(Continued)

(52) U.S. Cl.
CPC .................. *F02K 3/10* (2013.01); *F02C 3/04* (2013.01); *F02C 9/26* (2013.01); *F23R 3/10* (2013.01); *F23R 3/286* (2013.01); *F23R 3/346* (2013.01)

(58) Field of Classification Search
CPC .......... F23R 3/346; F23R 3/343; F23R 3/286; F23R 3/283; F23R 3/10; F23R 2900/03343; F23D 14/64; F02K 3/10; F02C 3/04
See application file for complete search history.

(56) References Cited

U.S. PATENT DOCUMENTS 2,565,843 A    8/1951  Dennison
3,238,718 A    3/1966  Hill
(Continued)

FOREIGN PATENT DOCUMENTS

CN    103471099 A    12/2013
CN    104061498 A     9/2014
(Continued)

OTHER PUBLICATIONS

U.S. Appl. No. 15/343,601, filed Nov. 4, 2016.
(Continued)

*Primary Examiner* — Todd E Manahan
*Assistant Examiner* — Rodolphe Andre Chabreyrie
(74) *Attorney, Agent, or Firm* — Venable LLP; Edward A. Kmett; Michele V. Frank

(57) ABSTRACT

Embodiments of a combustion section including a fuel injector assembly are provided. The combustion section includes the fuel injector assembly coupled to an outer casing and a liner assembly. The fuel injector assembly includes a body defining a first inlet opening and a second inlet opening spaced apart from one another along a first direction. The body further defines a fuel-oxidizer mixing passage therewithin extended along a second direction at least partially orthogonal to the first direction. The first inlet opening and the second inlet opening are each in fluid communication with the fuel-oxidizer mixing passage. The body defines an outlet opening at the fuel-oxidizer mixing passage at a distal end relative to the first inlet opening and the second inlet opening. The first inlet opening and the second inlet opening are each configured to admit a flow of oxidizer to the fuel-oxidizer mixing passage. The fuel-oxidizer mixing passage is configured to provide a flow of fuel-oxidizer mixture to a combustion chamber via the outlet opening.

21 Claims, 11 Drawing Sheets

(51) Int. Cl.
*F23R 3/28* (2006.01)
*F02K 3/10* (2006.01)
*F23R 3/10* (2006.01)
*F02C 3/04* (2006.01)

(56) References Cited

U.S. PATENT DOCUMENTS

| | | |
|---|---|---|
| 3,917,173 A | 11/1975 | Singh |
| 3,946,552 A | 3/1976 | Weinstein et al. |
| 3,972,182 A | 8/1976 | Salvi |
| 3,980,233 A | 9/1976 | Simmons et al. |
| 4,100,733 A | 7/1978 | Striebel et al. |
| 4,177,637 A | 12/1979 | Pask |
| 4,215,535 A | 8/1980 | Lewis |
| 4,222,232 A | 9/1980 | Robinson |
| 4,226,083 A | 10/1980 | Lewis et al. |
| 4,262,482 A | 4/1981 | Roffe et al. |
| 4,408,461 A | 10/1983 | Bruhwiler et al. |
| 4,412,414 A | 11/1983 | Novick et al. |
| 4,689,961 A | 9/1987 | Stratton |
| 4,763,481 A | 8/1988 | Cannon |
| 4,967,561 A | 11/1990 | Bruhwiler et al. |
| 4,993,220 A | 2/1991 | Shekleton et al. |
| 5,069,033 A | 12/1991 | Shekleton et al. |
| 5,121,597 A | 6/1992 | Urushidani et al. |
| 5,207,064 A | 5/1993 | Ciokajlo et al. |
| 5,211,675 A | 5/1993 | Bardey et al. |
| 5,235,814 A | 8/1993 | Leonard |
| 5,251,447 A | 10/1993 | Joshi et al. |
| 5,263,325 A | 11/1993 | McVey et al. |
| 5,265,409 A | 11/1993 | Smith, Jr. et al. |
| 5,307,634 A | 5/1994 | Hu |
| 5,321,948 A | 6/1994 | Leonard |
| 5,339,635 A | 8/1994 | Iwai et al. |
| 5,351,477 A | 10/1994 | Joshi et al. |
| 5,373,693 A | 12/1994 | Zarzalis et al. |
| 5,511,375 A | 4/1996 | Joshi et al. |
| 5,592,821 A | 1/1997 | Alary et al. |
| 5,619,855 A | 4/1997 | Burrus |
| 5,622,054 A | 4/1997 | Tingle |
| 5,657,632 A | 8/1997 | Foss |
| 5,791,137 A | 8/1998 | Evans et al. |
| 5,816,041 A * | 10/1998 | Greninger ............... F23R 3/286 60/775 |
| 5,816,049 A | 10/1998 | Joshi |
| 5,829,967 A | 11/1998 | Chyou |
| 5,839,283 A | 11/1998 | Dobbeling |
| 5,862,668 A | 1/1999 | Richardson |
| 5,881,756 A | 3/1999 | Abbasi et al. |
| 5,937,653 A | 8/1999 | Alary et al. |
| 6,016,658 A | 1/2000 | Willis et al. |
| 6,038,861 A | 3/2000 | Amos et al. |
| 6,112,511 A * | 9/2000 | Myers ..................... F01D 9/065 60/39.55 |
| 6,158,223 A | 12/2000 | Mandai et al. |
| 6,272,840 B1 | 8/2001 | Crocker et al. |
| 6,286,298 B1 | 9/2001 | Burrus et al. |
| 6,295,801 B1 | 10/2001 | Burrus et al. |
| 6,311,472 B1 * | 11/2001 | Nicodemus ........... F02C 7/2365 417/54 |
| 6,331,109 B1 | 12/2001 | Paikert et al. |
| 6,339,923 B1 * | 1/2002 | Halila ..................... F23R 3/286 60/738 |
| 6,360,525 B1 | 3/2002 | Senior et al. |
| 6,367,262 B1 | 4/2002 | Mongia et al. |
| 6,442,939 B1 | 9/2002 | Stuttaford et al. |
| 6,460,339 B2 | 10/2002 | Nishida et al. |
| 6,539,721 B2 | 4/2003 | Oikawa et al. |
| 6,539,724 B2 | 4/2003 | Cornwell et al. |
| 6,543,235 B1 | 4/2003 | Crocker et al. |
| 6,564,555 B2 | 5/2003 | Rice et al. |
| 6,594,999 B2 | 7/2003 | Mandai et al. |
| 6,598,584 B2 | 7/2003 | Beck et al. |
| 6,609,376 B2 | 8/2003 | Rokke |
| 6,662,564 B2 | 12/2003 | Bruck et al. |
| 6,732,527 B2 | 5/2004 | Day |
| 6,742,338 B2 | 6/2004 | Tanaka et al. |
| 6,772,594 B2 | 8/2004 | Nishida et al. |
| 6,837,050 B2 | 1/2005 | Mandai et al. |
| 6,837,051 B2 | 1/2005 | Mandai et al. |
| 6,898,938 B2 | 5/2005 | Mancini et al. |
| 6,915,637 B2 | 7/2005 | Nishida et al. |
| 6,959,550 B2 | 11/2005 | Day |
| 6,962,055 B2 | 11/2005 | Chen et al. |
| 7,036,482 B2 | 5/2006 | Beck et al. |
| 7,117,677 B2 | 10/2006 | Inoue et al. |
| 7,143,583 B2 | 12/2006 | Hayashi et al. |
| 7,188,476 B2 | 3/2007 | Inoue et al. |
| 7,200,998 B2 | 4/2007 | Inoue et al. |
| 7,284,378 B2 | 10/2007 | Amond, III et al. |
| 7,308,794 B2 * | 12/2007 | Morenko ................ F23R 3/10 60/752 |
| 7,313,919 B2 | 1/2008 | Inoue et al. |
| 7,343,745 B2 | 3/2008 | Inoue et al. |
| 7,360,363 B2 | 4/2008 | Mandai et al. |
| 7,434,401 B2 | 10/2008 | Hayashi |
| 7,469,544 B2 | 12/2008 | Farhangi |
| 7,516,607 B2 | 4/2009 | Farhangi et al. |
| 7,565,803 B2 | 7/2009 | Li et al. |
| 7,578,120 B2 * | 8/2009 | Jeske ..................... F01K 21/047 60/39.3 |
| 7,610,759 B2 | 11/2009 | Yoshida et al. |
| 7,673,454 B2 | 3/2010 | Saito et al. |
| 7,677,026 B2 | 3/2010 | Conete et al. |
| 7,762,074 B2 | 7/2010 | Bland et al. |
| 7,770,397 B2 | 8/2010 | Patel et al. |
| 7,788,929 B2 | 9/2010 | Biebel et al. |
| 7,810,333 B2 | 10/2010 | Kraemer et al. |
| 7,841,180 B2 | 11/2010 | Kraemer et al. |
| 7,871,262 B2 | 1/2011 | Carroni et al. |
| 7,966,801 B2 | 6/2011 | Umeh et al. |
| 8,033,112 B2 | 10/2011 | Milosavljevic et al. |
| 8,033,821 B2 | 10/2011 | Eroglu |
| 8,057,224 B2 | 11/2011 | Knoepfel |
| 8,161,751 B2 | 4/2012 | Hall |
| 8,171,736 B2 * | 5/2012 | Hawie ..................... F23R 3/50 60/752 |
| 8,225,591 B2 | 7/2012 | Johnson et al. |
| 8,225,613 B2 | 7/2012 | Sisco et al. |
| 8,234,871 B2 | 8/2012 | Davis, Jr. et al. |
| 8,276,385 B2 | 10/2012 | Zuo et al. |
| 8,316,644 B2 | 11/2012 | Wilbraham |
| 8,316,645 B2 | 11/2012 | Lee et al. |
| 8,322,143 B2 | 12/2012 | Uhm et al. |
| 8,347,630 B2 | 1/2013 | Lovett et al. |
| 8,375,721 B2 | 2/2013 | Wilbraham |
| 8,424,311 B2 | 4/2013 | York et al. |
| 8,438,851 B1 | 5/2013 | Uhm et al. |
| 8,448,449 B2 * | 5/2013 | Carlisle .................. F23R 3/283 60/796 |
| 8,464,537 B2 * | 6/2013 | Khan ..................... F23R 3/286 60/737 |
| 8,511,087 B2 | 8/2013 | Fox et al. |
| 8,528,337 B2 | 9/2013 | Berry et al. |
| 8,539,773 B2 | 9/2013 | Ziminsky et al. |
| 8,539,774 B2 * | 9/2013 | Carlisle .................. F23C 5/02 60/740 |
| 8,550,809 B2 | 10/2013 | Uhm et al. |
| 8,590,311 B2 | 11/2013 | Parsania et al. |
| 8,621,870 B2 | 1/2014 | Carroni et al. |
| 8,671,691 B2 | 3/2014 | Boardman et al. |
| 8,683,804 B2 | 4/2014 | Boardman et al. |
| 8,701,417 B2 | 4/2014 | Nicholls et al. |
| 8,752,386 B2 | 6/2014 | Fox et al. |
| 8,834,074 B2 * | 9/2014 | Leininger ............. B01F 5/0655 406/92 |
| 8,850,820 B2 | 10/2014 | Milosavljevic et al. |
| 8,863,524 B2 | 10/2014 | Karlsson et al. |
| 8,938,971 B2 | 1/2015 | Poyyapakkam et al. |
| 8,943,835 B2 | 2/2015 | Corsmeier et al. |
| 9,091,444 B2 | 7/2015 | Turrini et al. |
| 9,115,899 B2 | 8/2015 | Koizumi et al. |
| 9,121,613 B2 | 9/2015 | Carnell, Jr. et al. |
| 9,134,023 B2 | 9/2015 | Boardman et al. |

(56) References Cited

U.S. PATENT DOCUMENTS

| | | | |
|---|---|---|---|
| 9,134,031 B2 | 9/2015 | Nadkarni | |
| 9,182,123 B2 | 11/2015 | Boardman et al. | |
| 9,222,666 B2 | 12/2015 | Liu | |
| 9,303,872 B2 * | 4/2016 | Hadley | F23R 3/346 |
| 9,335,050 B2 | 5/2016 | Cunha et al. | |
| 9,377,192 B2 * | 6/2016 | Hirata | F23R 3/36 |
| 9,388,985 B2 | 7/2016 | Wu et al. | |
| 9,416,973 B2 | 8/2016 | Melton et al. | |
| 9,423,137 B2 | 8/2016 | Nickolaus | |
| 9,447,974 B2 | 9/2016 | Max et al. | |
| 9,618,208 B2 | 4/2017 | Hobbs et al. | |
| 9,810,152 B2 | 11/2017 | Genin et al. | |
| 9,939,156 B2 | 4/2018 | Miduturi et al. | |
| 9,976,522 B2 | 5/2018 | Patel et al. | |
| 10,041,417 B2 * | 8/2018 | Horikawa | F02C 3/22 |
| 10,295,190 B2 * | 5/2019 | Boardman | F23R 3/28 |
| 10,302,853 B2 | 5/2019 | Kao et al. | |
| 10,352,569 B2 * | 7/2019 | Boardman | F23R 3/286 |
| 10,393,382 B2 * | 8/2019 | Boardman | F23R 3/14 |
| 10,465,909 B2 * | 11/2019 | Boardman | F23R 3/14 |
| 10,634,353 B2 * | 4/2020 | Bennett | F23R 3/283 |
| 10,724,740 B2 * | 7/2020 | Boardman | F23R 3/283 |
| 10,890,329 B2 * | 1/2021 | Boardman | F23R 3/286 |
| 10,935,245 B2 * | 3/2021 | Boardman | F02C 7/22 |
| 2002/0083711 A1 | 7/2002 | Dean et al. | |
| 2002/0172904 A1 | 11/2002 | Day | |
| 2003/0101729 A1 | 6/2003 | Srinivasan | |
| 2004/0154301 A1 | 8/2004 | Day | |
| 2006/0021350 A1 | 2/2006 | Sanders | |
| 2007/0099142 A1 | 5/2007 | Flohr et al. | |
| 2007/0227148 A1 | 10/2007 | Bland et al. | |
| 2007/0259296 A1 | 11/2007 | Knoepfel | |
| 2008/0083229 A1 | 4/2008 | Haynes et al. | |
| 2008/0280239 A1 | 11/2008 | Carroni et al. | |
| 2009/0173075 A1 | 7/2009 | Miura et al. | |
| 2009/0178412 A1 * | 7/2009 | Spytek | F02C 6/003 60/752 |
| 2009/0293484 A1 | 12/2009 | Inoue et al. | |
| 2010/0083663 A1 | 4/2010 | Fernandes et al. | |
| 2010/0186412 A1 | 7/2010 | Stevenson et al. | |
| 2010/0229557 A1 * | 9/2010 | Matsumoto | F23R 3/346 60/737 |
| 2010/0236247 A1 | 9/2010 | Davis, Jr. et al. | |
| 2010/0275601 A1 | 11/2010 | Berry et al. | |
| 2011/0000215 A1 | 1/2011 | Lacy et al. | |
| 2011/0016866 A1 | 1/2011 | Boardman et al. | |
| 2011/0016871 A1 | 1/2011 | Kraemer et al. | |
| 2011/0083439 A1 | 4/2011 | Zuo et al. | |
| 2011/0252803 A1 | 10/2011 | Subramanian et al. | |
| 2011/0265482 A1 | 11/2011 | Parsania et al. | |
| 2011/0289933 A1 | 12/2011 | Boardman et al. | |
| 2012/0096866 A1 | 4/2012 | Khan et al. | |
| 2012/0131923 A1 | 5/2012 | Elkady et al. | |
| 2012/0279223 A1 | 11/2012 | Barker et al. | |
| 2012/0285173 A1 | 11/2012 | Poyyapakkam et al. | |
| 2013/0042625 A1 | 2/2013 | Barker et al. | |
| 2013/0074510 A1 | 3/2013 | Berry | |
| 2013/0101729 A1 | 4/2013 | Keremes et al. | |
| 2013/0101943 A1 | 4/2013 | Uhm et al. | |
| 2013/0174558 A1 * | 7/2013 | Stryapunin | F23R 3/002 60/734 |
| 2013/0177858 A1 | 7/2013 | Boardman et al. | |
| 2013/0199188 A1 | 8/2013 | Boardman et al. | |
| 2013/0239581 A1 | 9/2013 | Johnson et al. | |
| 2013/0318977 A1 | 12/2013 | Berry et al. | |
| 2013/0336759 A1 | 12/2013 | Christians | |
| 2014/0033718 A1 | 2/2014 | Manoharan et al. | |
| 2014/0053571 A1 | 2/2014 | Keener et al. | |
| 2014/0060060 A1 | 3/2014 | Bernero et al. | |
| 2014/0096502 A1 | 4/2014 | Karlsson et al. | |
| 2014/0290258 A1 | 10/2014 | Gerendas et al. | |
| 2015/0076251 A1 | 3/2015 | Berry | |
| 2015/0121886 A1 * | 5/2015 | McCormick | F23R 3/52 60/762 |
| 2015/0128607 A1 | 5/2015 | Lee | |
| 2015/0159875 A1 | 6/2015 | Berry et al. | |
| 2015/0285504 A1 * | 10/2015 | Melton | B23K 26/702 60/737 |
| 2016/0010856 A1 | 1/2016 | Biagioli et al. | |
| 2016/0169110 A1 | 6/2016 | Myers et al. | |
| 2016/0209036 A1 | 7/2016 | Cheung | |
| 2016/0258629 A1 * | 9/2016 | Slobodyanskiy | F23R 3/286 |
| 2016/0290650 A1 | 10/2016 | Abd El-Nabi et al. | |
| 2017/0268785 A1 * | 9/2017 | Crawley | F01D 9/041 |
| 2017/0350598 A1 | 12/2017 | Boardman et al. | |
| 2018/0178229 A1 | 6/2018 | Ryon et al. | |

FOREIGN PATENT DOCUMENTS

| | | |
|---|---|---|
| EP | 1260768 A2 | 11/2002 |
| EP | 1391653 A2 | 2/2004 |
| EP | 3249301 A1 | 11/2017 |
| WO | WO2008/071902 A1 | 6/2008 |

OTHER PUBLICATIONS

U.S. Appl. No. 15/343,634, filed Nov. 4, 2016.
U.S. Appl. No. 15/343,746, filed Nov. 4, 2016.
U.S. Appl. No. 15/343,672, filed Nov. 4, 2016.
U.S. Appl. No. 15/343,814, filed Nov. 4, 2016.
U.S. Appl. No. 15/909,211, filed Mar. 1, 2018.
Srinivasan et al., "Improving low load combustion, stability, and emissions in pilot-ignited natural gas engines", Journal of Automobile Engineering, Sage journals, vol. 220, No. 2, Feb. 1, 2006, pp. 229-239.
Snyder et al., "Emission and Performance of a Lean-Premixed Gas Fuel Injection System for Aeroderivative Gas Turbine Engines", Journal of Engineering for Gas Turbines and Power, ASME Digital Collection, vol. 118, Issue 1, Jan. 1, 1996, pp. 38-45.

* cited by examiner

COMBUSTION SECTION AND FUEL INJECTOR ASSEMBLY FOR A HEAT ENGINE

FIELD

The present subject matter relates generally to combustion sections and fuel injectors for heat engines. The present subject matter relates specifically to fuel injector assemblies at combustion sections for turbine engines.

BACKGROUND

Heat engines, such as gas turbine engines, generally include fuel nozzles including turning features such as to provide an axial flow of fuel to a combustion section. Known fuel nozzle assemblies generally include complex aero/thermal or mechanical structures necessitating complex manufacturing methods to produce. Such structures, including considerably long flow paths within the fuel nozzle, are challenged with fuel coking, structural deterioration, undesirably fuel properties, and consequent undesired affects to combustion efficiency, performance, and operability. As such, there is a need for combustion sections and fuel delivery devices that mitigate some or all of these issues.

BRIEF DESCRIPTION

Aspects and advantages of the invention will be set forth in part in the following description, or may be obvious from the description, or may be learned through practice of the invention.

Embodiments of a combustion section including a fuel injector assembly are provided. The combustion section includes the fuel injector assembly coupled to an outer casing and a liner assembly. The fuel injector assembly includes a body defining a first inlet opening and a second inlet opening spaced apart from one another along a first direction. The body further defines a fuel-oxidizer mixing passage therewithin extended along a second direction at least partially orthogonal to the first direction. The first inlet opening and the second inlet opening are each in fluid communication with the fuel-oxidizer mixing passage. The body defines an outlet opening at the fuel-oxidizer mixing passage at a distal end relative to the first inlet opening and the second inlet opening. The first inlet opening and the second inlet opening are each configured to admit a flow of oxidizer to the fuel-oxidizer mixing passage. The fuel-oxidizer mixing passage is configured to provide a flow of fuel-oxidizer mixture to a combustion chamber via the outlet opening.

The combustion section further includes an outer casing extended along the longitudinal direction and a liner assembly disposed inward of the outer casing along the radial direction. The liner assembly is extended along the longitudinal direction, the liner assembly defining a combustion chamber therewithin. A pressure plenum is defined around the liner assembly inward of the outer casing. The body of the fuel injector assembly is coupled to the outer casing and the liner assembly.

In various embodiments, the body defines the outlet opening extended at least partially along the longitudinal direction. In one embodiment, the body defines the outlet opening as a slot in direct fluid communication with the combustion chamber. The outlet opening is extended along the longitudinal direction through the liner assembly.

In still various embodiments, the combustion section includes a plurality of bodies in adjacent longitudinal arrangement through the liner assembly. In one embodiment, the plurality of bodies is staggered along the circumferential direction. In another embodiment, one or more of the plurality of bodies is disposed at an oblique angle relative to the longitudinal direction.

In one embodiment, the fuel-oxidizer mixing passage is defined at an acute angle relative to the radial direction extended from the centerline axis.

In another embodiment, the body further defines a third inlet opening through one or more of the first wall or the second wall. The third inlet opening is in fluid communication with the fuel-oxidizer mixing passage. The third inlet opening is configured to provide a flow of oxidizer from the pressure plenum to the fuel-oxidizer mixing passage.

In one embodiment, the combustion section includes a combustor-diffuser assembly. In another embodiment, the combustion section includes an inter-turbine burner. In still another embodiment, the combustion section includes an afterburning exhaust system.

In one embodiment, the body defines a fuel passage exit opening directly between the inlet passage at the first inlet opening and the inlet passage at the second inlet opening along the tangential direction.

In various embodiments, the body includes a third wall extended at least partially along the radial direction, and wherein a fuel passage is defined through the third wall.

In one embodiment, the body defines a plurality of first inlet openings and a plurality of second inlet openings each in adjacent arrangement along the longitudinal direction, in which the body defines a plurality of third inlet openings between one or both of the first inlet openings or second inlet openings along longitudinal direction. In another embodiment, the body defines a plurality of fuel passages in adjacent arrangement along the longitudinal direction. In yet another embodiment, the body defines a third inlet passage extended at least partially along the tangential direction, in which the third inlet passage is defined between a pair of the third wall. In still another embodiment, the third inlet passage is disposed upstream of a fuel passage exit opening through which a flow of fuel is provided to the fuel-oxidizer mixing passage.

In one embodiment, a fuel passage is extended through the outer casing and the body in fluid communication with the fuel-oxidizer mixing passage, wherein the fuel passage is configured to provide a flow of fuel to the fuel-oxidizer mixing passage.

In various embodiments, the first wall and the second wall are each extended along the radial direction and the circumferential direction. The fuel-oxidizer mixing passage defined therebetween is disposed at an acute angle relative to the radial direction. In one embodiment, the acute angle is between approximately 25 degrees and approximately 75 degrees relative to the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
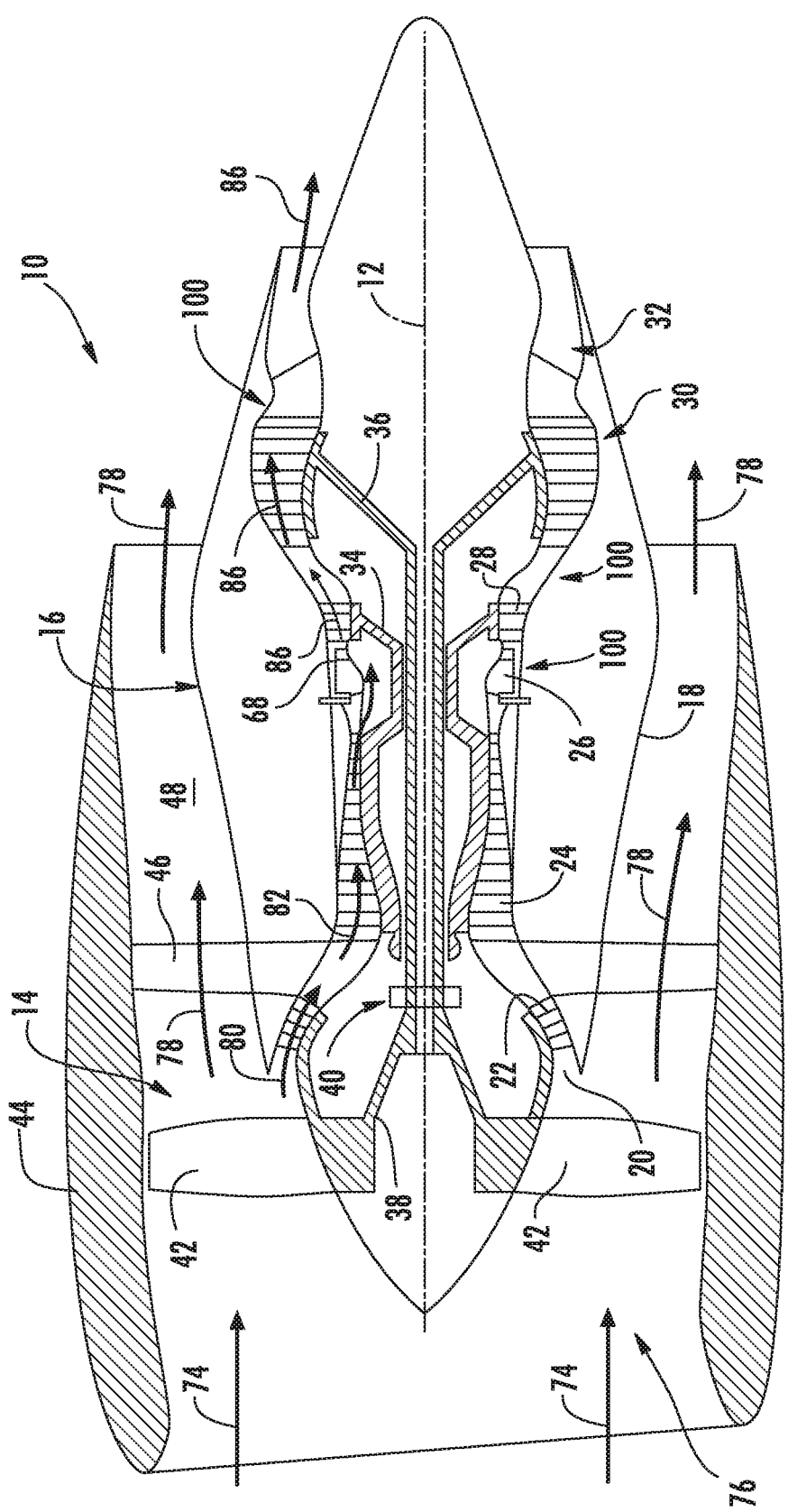
FIG. 1 is a schematic cross sectional view of an exemplary heat engine including a combustion section and fuel injector assembly according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a combustion section including a fuel injector assembly are provided herein that may improve efficiency, performance, and durability in contrast to conventional fuel nozzles. The combustion section includes a fuel injector assembly extended through an outer casing and liner assembly such as to provide a relatively shorter, simplified straight mixer or fuel injector obviating dog-leg or L-shaped stems and housings and thermal loadings, deteriorations, and aero/thermal, mechanical, and manufacturing complexities associated therewith. Various embodiments of the fuel injector assembly may be disposed radially through an outer liner of a liner assembly to provide a flow of fuel, or fuel-oxidizer mixture, directly to a combustion chamber. A plurality of the fuel injector assembly may be disposed along a longitudinal direction to beneficially alter or modulate heat release characteristics such as to improve combustion dynamics, performance, and efficiency.

Referring now to the drawings, FIG. 1 is a schematic partially cross-sectioned side view of an exemplary heat engine 10 herein referred to as "engine 10" as may incorporate various embodiments of the present disclosure. Although further described below with reference to a gas turbine engine, the present disclosure is also applicable to turbomachinery in general, including gas turbine engines defining turbofan, turbojet, turboprop, and turboshaft gas turbine engines, including marine and industrial turbine engines and auxiliary power units, and steam turbine engines, internal combustion engines, reciprocating engines, and Brayton cycle machines generally. As shown in FIG. 1, the engine 10 has a longitudinal or axial centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustor-diffuser assembly 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
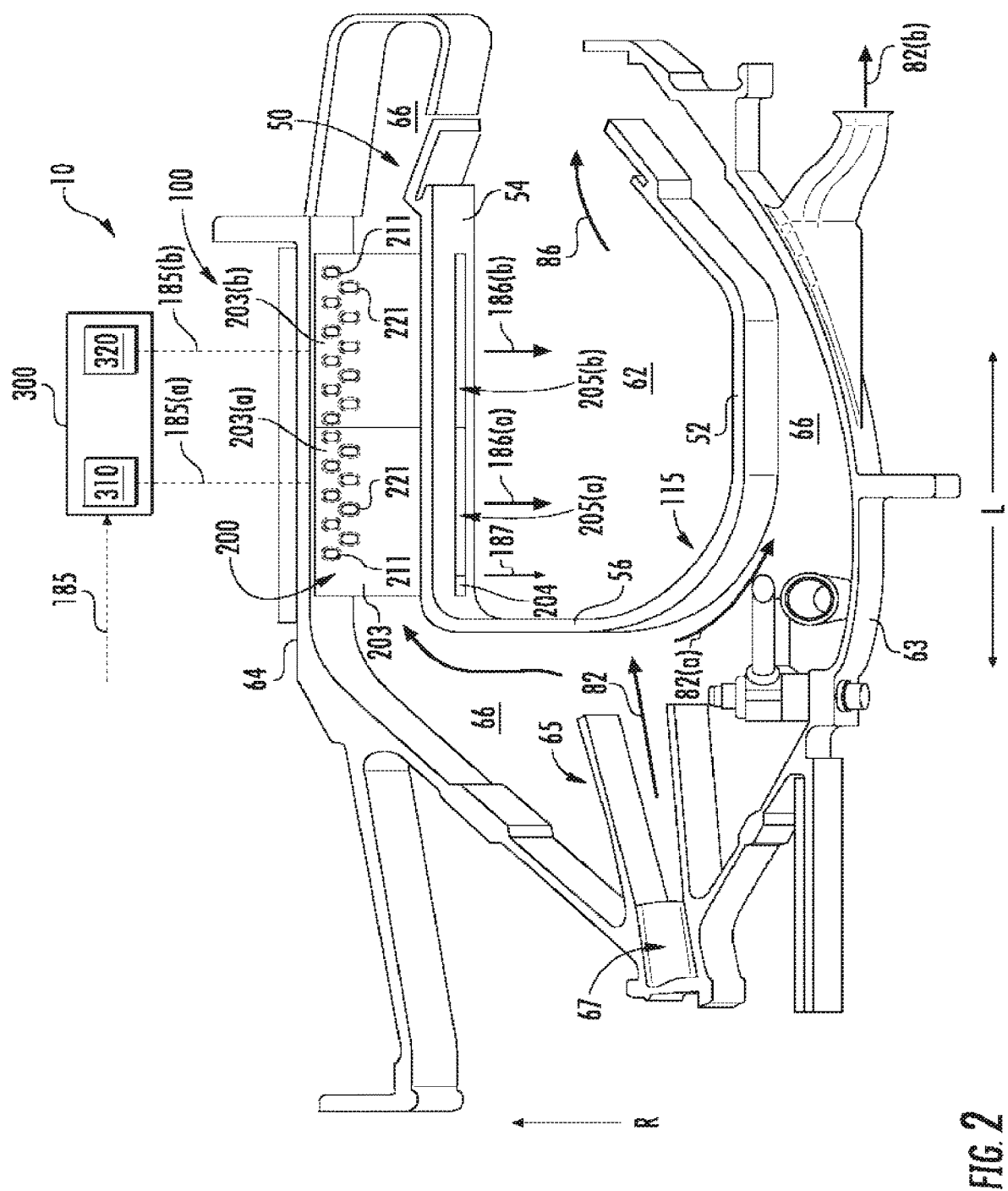
FIG. 2 is a cutaway cross sectional view of an exemplary combustion section and fuel injector assembly of the heat engine of FIG. 1 according to an aspect of the present disclosure.

FIG. 2 is a cross sectional side view of an exemplary combustion section 100 of the core engine 16 shown in FIG. 1. It should be appreciated that although the embodiment of the combustion section 100 depicted in regard to FIG. 2 is disposed at the combustor-diffuser assembly 26 between the HP compressor 24 and the HP turbine 28, other embodiments of the combustion section 100 may be disposed between the HP turbine 28 and the LP turbine 30 (FIG. 1), such as to define an inter-turbine burner (ITB), or downstream of the LP turbine 30, such as to define an exhaust re-light system or afterburning exhaust system. As shown in FIG. 2, the combustion section 100 may generally include a combustor assembly 50 having a liner assembly 115. The liner assembly 115 may include an annular inner liner 52, an annular outer liner 54 and an end wall 56 that extends radially between the inner liner 52 and the outer liner 54 respectfully. In various embodiments, the liner assembly 115 may define an annular liner assembly extended along a circumferential direction C (FIG. 6) relative to the centerline axis 12. However, it should be appreciated that other embodiments of the combustion section 100 including a fuel injector assembly 200 coupled thereto may include the liner assembly 115 defining a can or can-annular configuration, a reverse-flow combustor assembly, a rotating detonation combustor, etc. Although not shown in further detail, the liner assembly 115 may further include one or more openings to admit a portion of the flow of oxidizer 82 (e.g., air) into the combustion chamber 62, such as to provide quenching, cooling, or other properties to beneficially affect the combustion gases produced at the combustion chamber 62.

As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64 and an inner casing 63. The pressure plenum 66 may be defined around the inner liner 52 and/or the outer liner 54. The inner liner 52 and the outer liner 54 may extend from the end wall 56 towards a turbine nozzle assembly or inlet 68 to the HP turbine 28 (FIG. 1), thus at least partially defining a hot gas path between the combustor assembly 50 and the HP turbine 28.

During operation of the engine 10, as shown in FIGS. 1 and 2 collectively, a volume of oxidizer as indicated schematically by arrows 74 enters the engine 10 through an associated inlet 76 of the nacelle 44 and/or fan assembly 14. As the oxidizer 74 passes across the fan blades 42 a portion of the oxidizer as indicated schematically by arrows 78 is directed or routed into the bypass airflow passage 48 while another portion of the oxidizer as indicated schematically by arrow 80 is directed or routed into the LP compressor 22. Oxidizer 80 is progressively compressed as it flows through the LP and HP compressors 22, 24 towards the combustion section 100. As shown in FIG. 2, the now oxidizer as indicated schematically by arrows 82 flows across a compressor exit guide vane (CEGV) 67 and through a prediffuser 65 into the pressure plenum 66 of the combustion section 100.

The prediffuser 65 and CEGV 67 condition the flow of oxidizer 82 to the fuel injector assembly 200. The oxidizer 82 pressurizes the pressure plenum 66. The oxidizer 82 enters the fuel injector assembly 200 to mix with a fuel 185. The fuel 185 may be a gaseous or liquid fuel, including, but not limited to, fuel oils, jet fuels propane, ethane, hydrogen, coke oven gas, natural gas, synthesis gas, or combinations thereof.

Typically, the LP and HP compressors 22, 24 provide more oxidizer to the pressure plenum 66 than is needed for combustion. Therefore, a second portion of the oxidizer 82 as indicated schematically by arrows 82(a) may be used for various purposes other than combustion. For example, as shown in FIG. 2, oxidizer 82(a) may be routed into the pressure plenum 66 to provide cooling to the inner and outer liners 52, 54. In addition or in the alternative, at least a portion of oxidizer 82(a) may be routed out of the pressure plenum 66. For example, a portion of oxidizer 82(a) may be directed through various flow passages to provide cooling air to at least one of the HP turbine 28 or the LP turbine 30, such as depicted via arrows 82(b).

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 5:
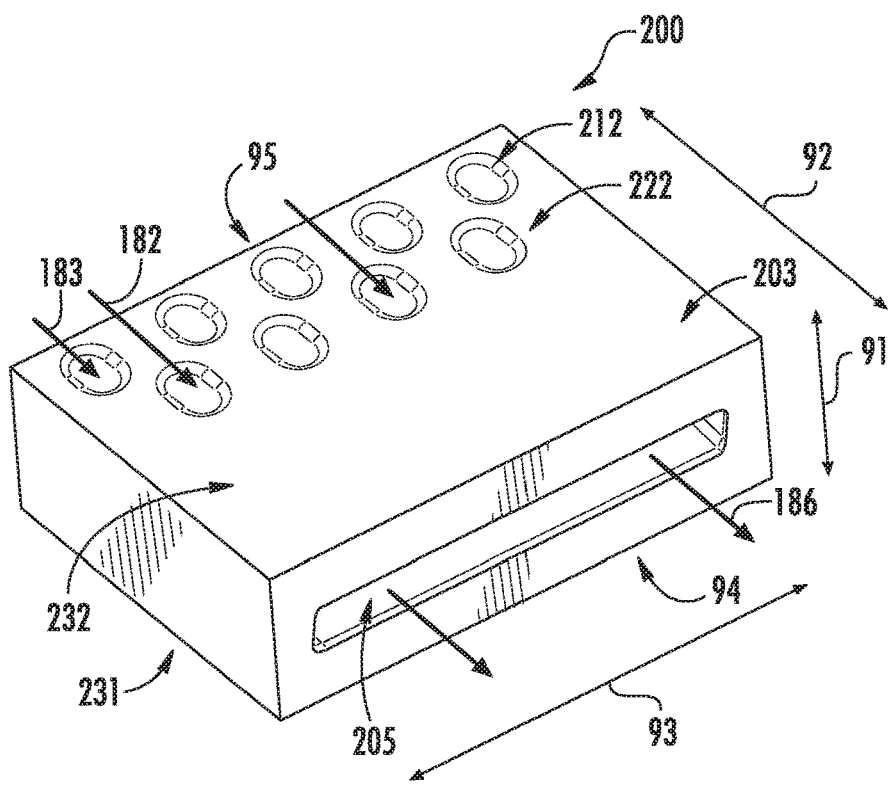
Figure 6:
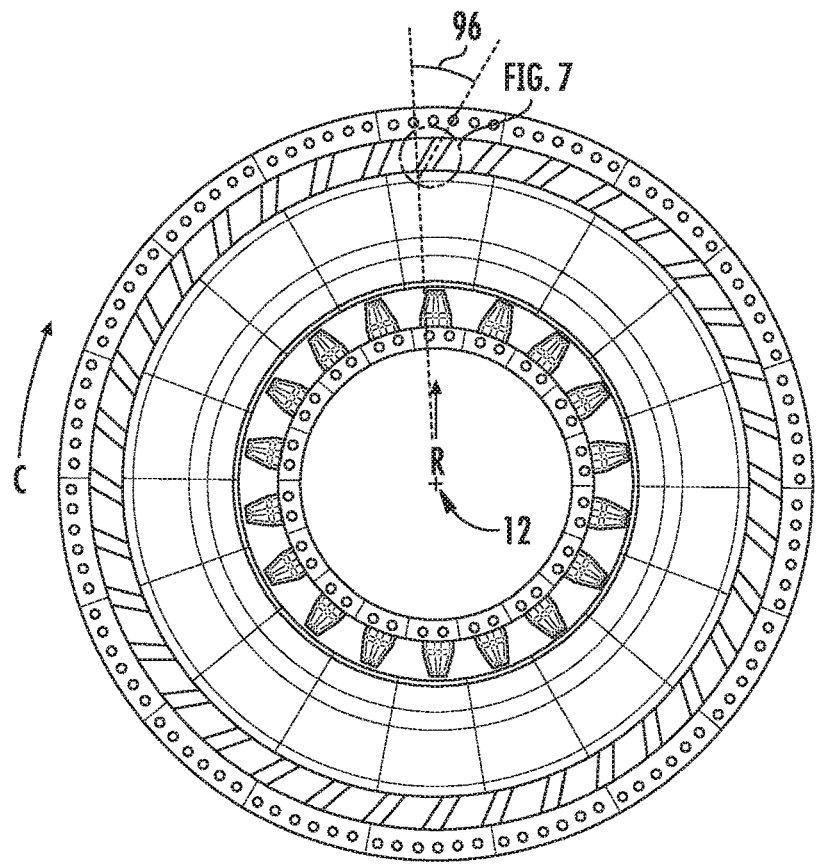
FIG. 6 is a flowpath cross sectional view of an embodiment of the heat engine including the combustion section and fuel injector assembly according to aspects of the present disclosure.
Figure 7:
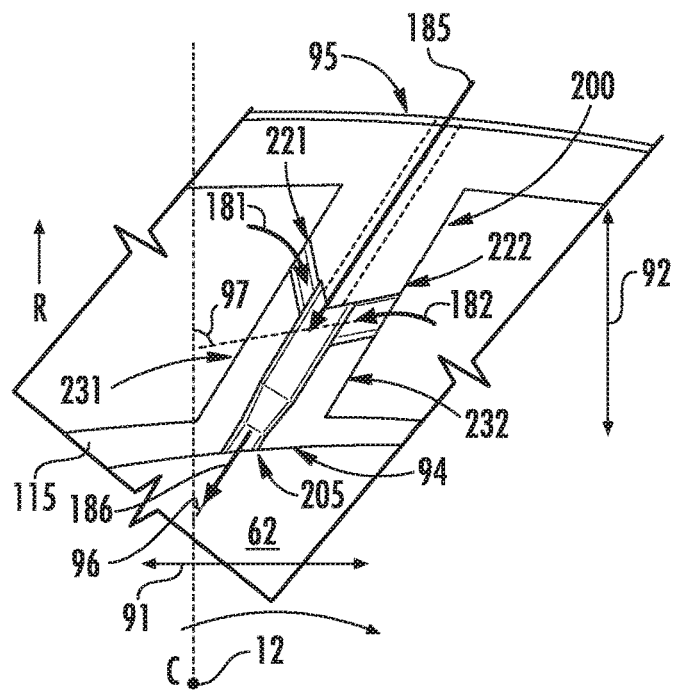
FIG. 7 is a detailed view of an embodiment of the fuel injector assembly according to aspects of the present disclosure.
Figure 8:
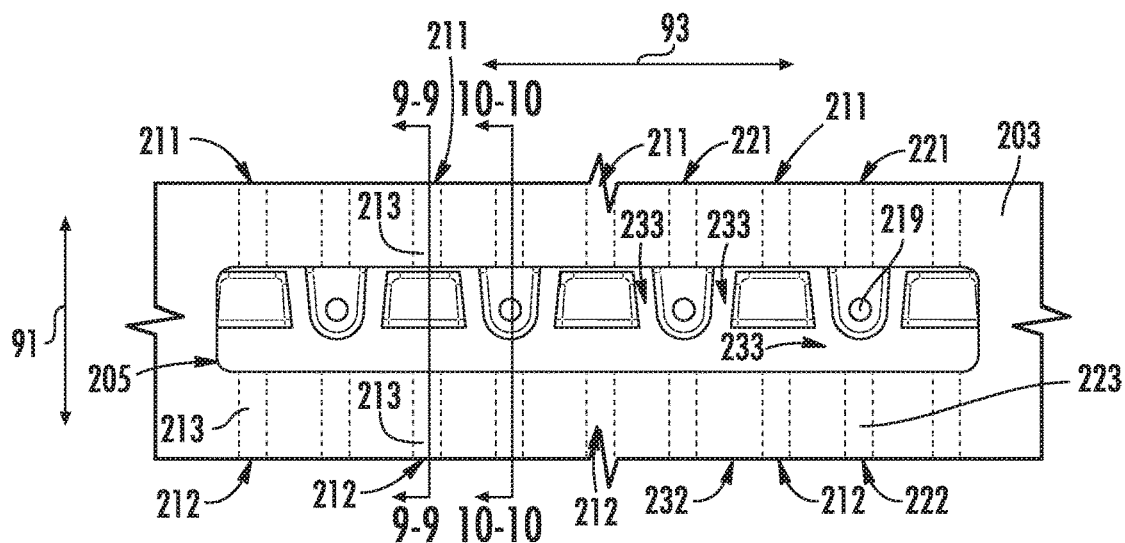
FIG. 8 is a detailed view of an embodiment of the fuel injector assembly viewed from a distal end into a fuel-oxidizer mixing passage.
Figure 9:
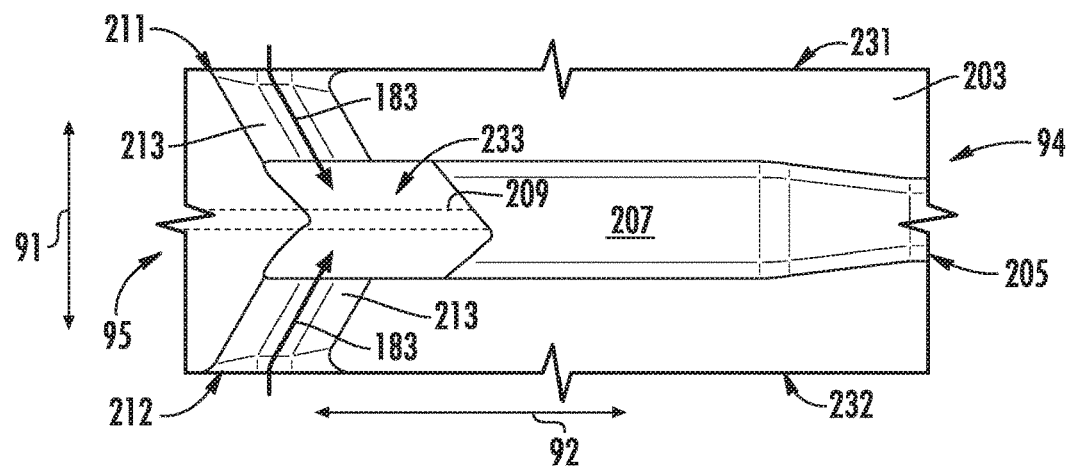
FIG. 9 is a cross sectional view of FIG. 8 at plane 9-9.
Figure 10:
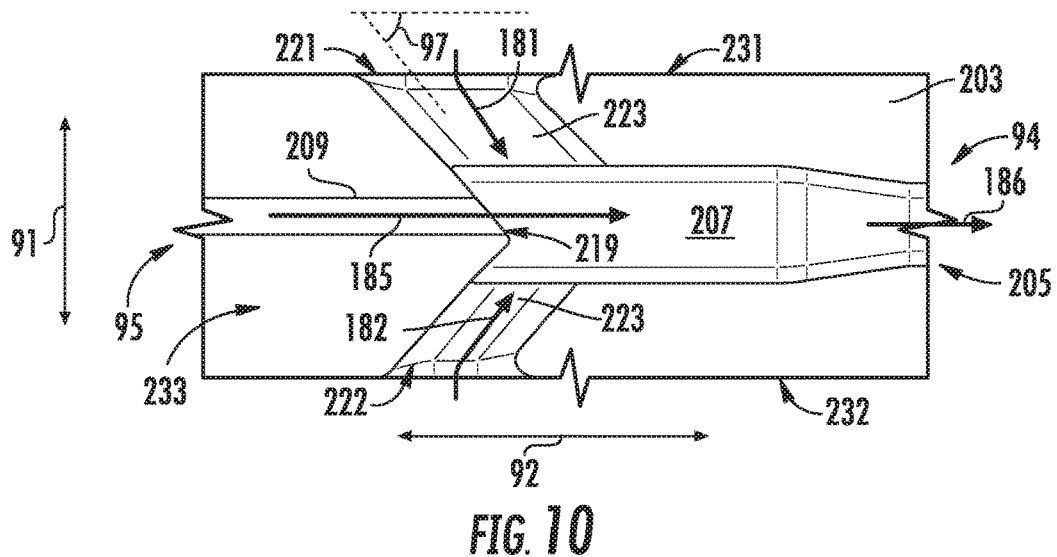
FIG. 10 is a cross sectional view of FIG. 8 at plane 10-10.

Referring collectively to FIGS. 2-10, the fuel injector assembly 200 includes a body 203 defining a first inlet opening 221 and a second inlet opening 222 spaced apart from one another along a first direction 91. The body 203 further defines within it a fuel-oxidizer mixing passage 207 (FIG. 7, 9, 10) extended along a second direction 92 at least partially orthogonal to the first direction 91. The first inlet opening 221 and the second inlet opening 222 are each in fluid communication with the fuel-oxidizer mixing passage 207 (FIGS. 7 and 10).

The body 203 further defines an outlet opening 205 at the fuel-oxidizer mixing passage 207 at a distal end 94 relative to the first inlet opening 221 and the second inlet opening 222 (i.e., the outlet opening 205 is defined through the body 203 away from the first inlet opening 221 and the second inlet opening 222 along the second direction 92). The first inlet opening 221 and the second inlet opening 222 are each configured to admit a flow of oxidizer (such as depicted schematically in FIGS. 3-5, and FIG. 10 via arrows 181, 182, respectively) to the fuel-oxidizer mixing passage 207 (depicted schematically in FIG. 10). The fuel-oxidizer mixing passage 207 is configured to provide a flow of fuel-oxidizer mixture (depicted schematically via arrows 186, 186(a), and 186(b) in FIGS. 2-5, FIG. 7, FIG. 10) to the combustion chamber 62 via the outlet opening 205.

Figure 3:
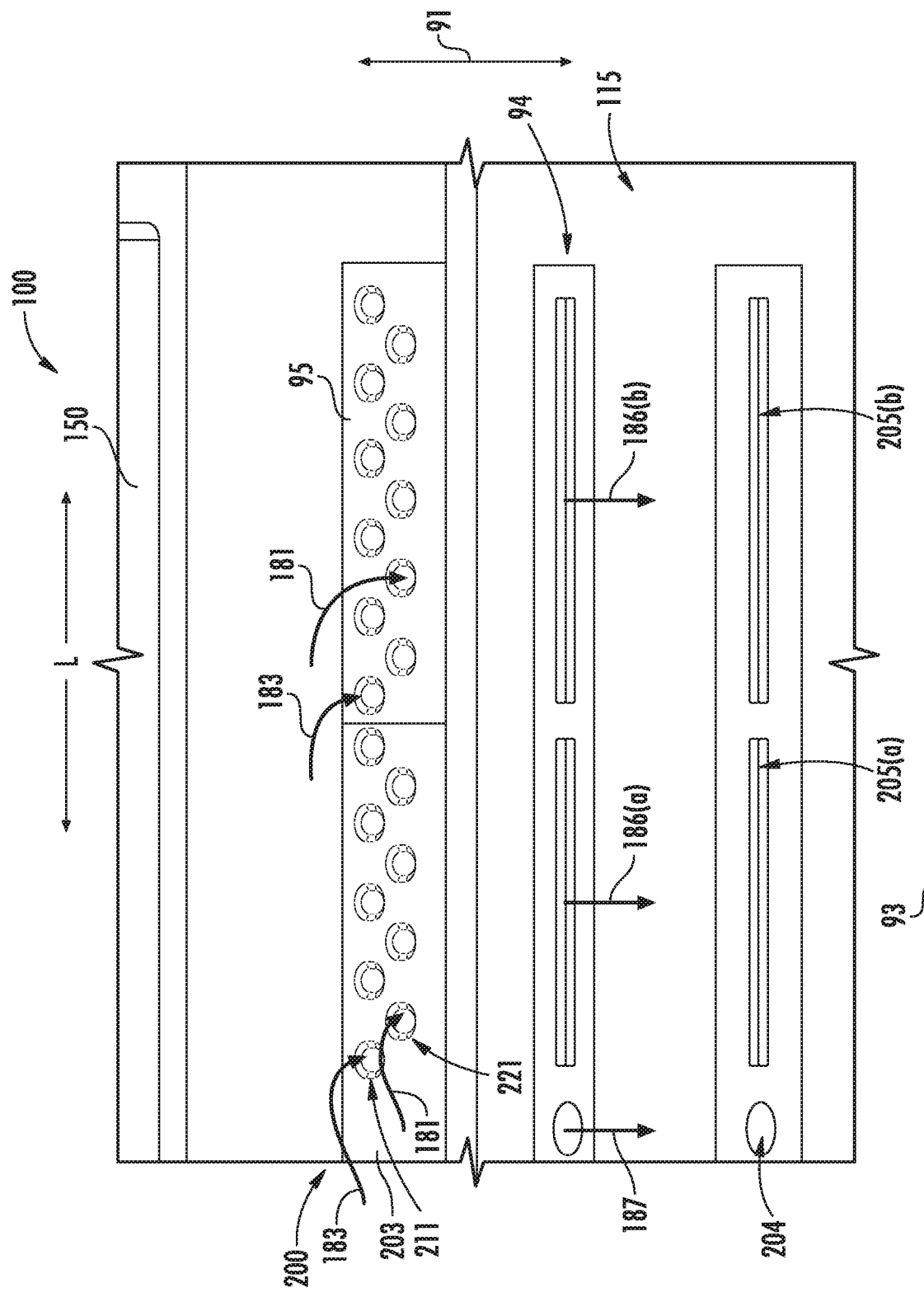
FIG. 3 is a detailed view of the fuel injector assembly of FIG. 2.

Referring more particularly to the embodiments of the combustion section 100 including the fuel injector assembly 200 coupled to the outer casing 64 and the liner assembly 115 depicted in FIGS. 2-3, the body 203 is extended at least partially through the liner assembly 115 in fluid communication with the combustion chamber 62. The body 203 is extended along the longitudinal direction L and coupled to the liner assembly 115 along the longitudinal direction L. For example, the body 203 of the fuel injector assembly 200 may be coupled to the outer liner 54 of the liner assembly 115 extended along the longitudinal direction L. In other embodiments shown and described herein, the body 203 of the fuel injector assembly 200 is coupled to the liner assembly 115 and extended along a third direction 93.

Referring back to FIGS. 2-10, in various embodiments, the body 203 includes a first wall 231 and a second wall 232 spaced apart from one another along the first direction 91, such as depicted in regard to FIGS. 3-5 and FIGS. 7-10. In one embodiment, the first inlet opening 221 is defined through the first wall 231 and second inlet opening 222 is defined through the second wall 232 each spaced apart from one another.

Although depicted as a substantially polygonal (e.g., rectangular) structure, various embodiments may further curve or sweep one or more of the first wall 231 and/or the second wall 232 as an airfoil shape, such as to define a pressure side, a suction side, or other pressure or flow characteristics to beneficially adjust entry of the flow of oxidizer 181, 182 into the body 203.

Referring particularly to FIGS. 4-5 and FIGS. 8-10, in various embodiments the body 203 defines the fuel-oxidizer mixing passage 207 extended along the second direction 92 between the first inlet opening 221 and the second inlet opening 222. In still various embodiments, the body 203 defines the outlet opening 205 extended at least partially along a third direction 93 orthogonal to the first direction 91 and the second direction 92.

In various exemplary embodiments in regard to the combustion section 100 depicted in FIGS. 2-3 and FIGS. 6-7, the third direction 93 may correspond to the longitudinal direction L. In one embodiment, the second direction 92 may correspond to the radial direction R. In an exemplary embodiment of the combustion section 100, the body 203 defines the outlet opening 205 as a slot extended along the third direction 93 at least partially orthogonal to the first direction 91 and the second direction 92. In one embodiment, the outlet opening 205 is extended through the liner assembly 115 at least partially along the longitudinal direction L. The body 203 is extended from the outer casing 64 through the liner assembly 115 such as to define the outlet opening 205 as a slot in direct fluid communication with the combustion chamber 62.

Figure 12:
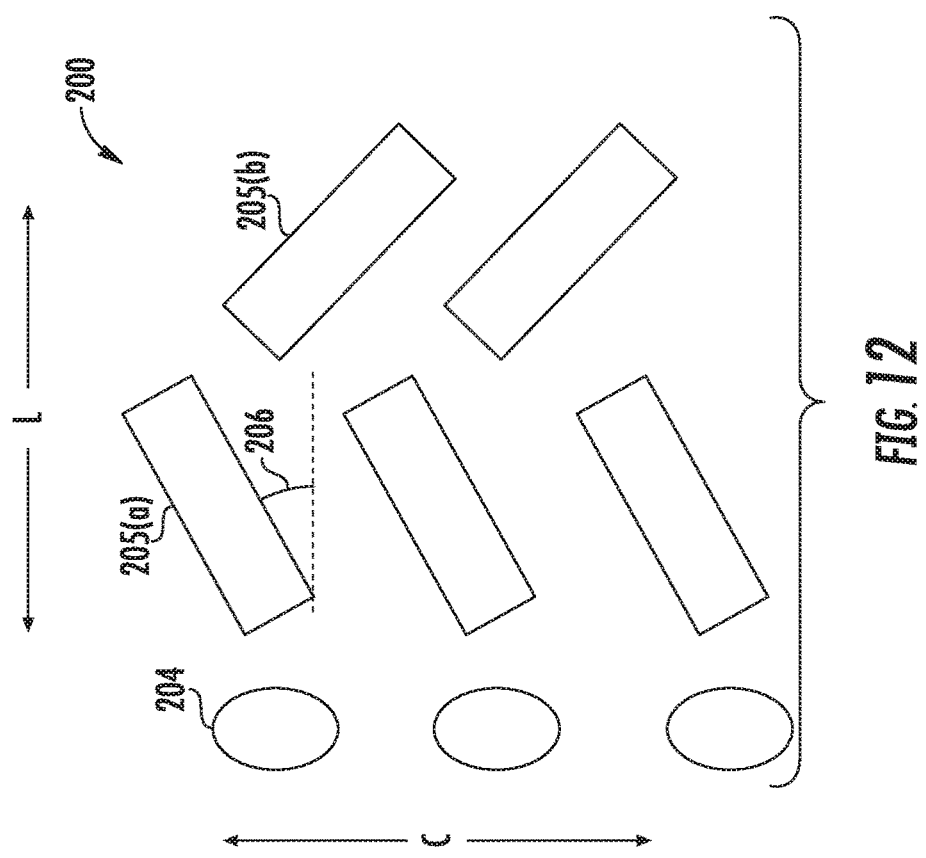
FIG. 12 is another schematic embodiment of an arrangement of outlet openings of the fuel injector assembly.
Figure 11:
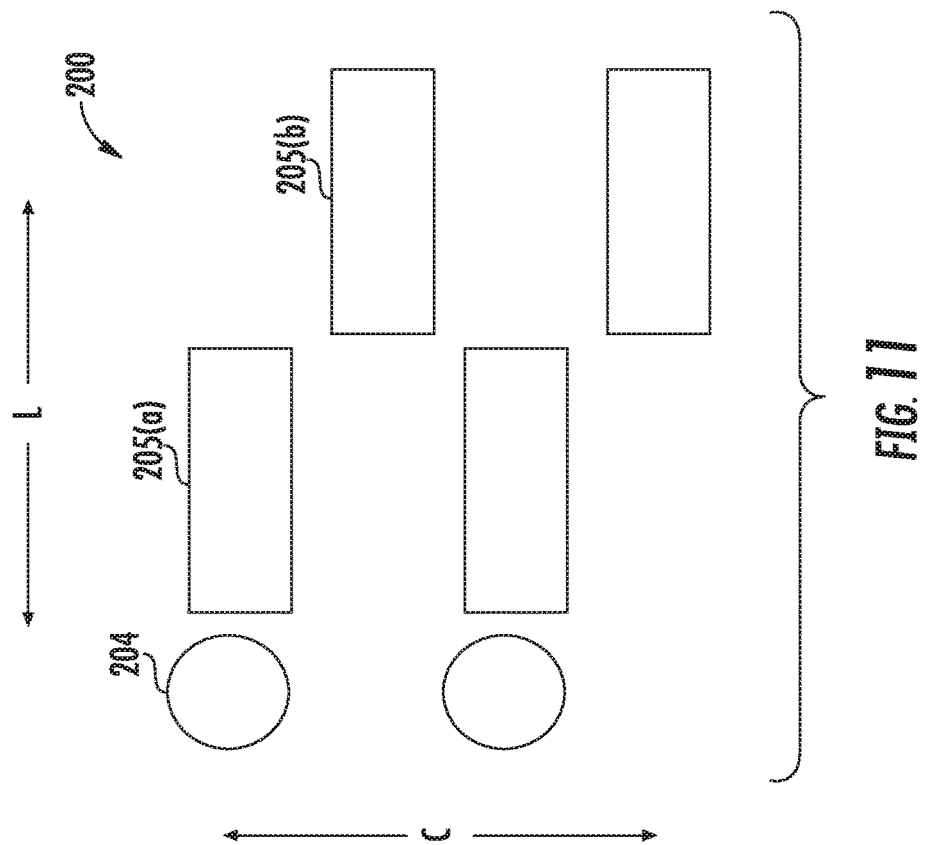
FIG. 11 is a schematic embodiment of an arrangement of outlet openings of the fuel injector assembly.

In various embodiments, the outlet opening 205 is extended at least partially along the longitudinal direction L through the liner assembly 115. Referring to FIGS. 11-12, schematic embodiments of arrangements of the outlet opening 205 relative to the flow path through the combustion chamber 62 along the longitudinal direction L are generally provided. Referring to FIGS. 2-3 and FIGS. 11-12, in various embodiments, the combustion section 100 may include a plurality of outlet openings 205, depicted as a first outlet opening 205(*a*) and a second outlet opening 205(*b*). The combustion section 100 may include a plurality of bodies 200, depicted as a first body 203(*a*) and a second body 203(*b*), each defining the outlet opening 205. In one exemplary embodiment, such as in regard to FIG. 11, the first outlet opening 205(*a*) and the second outlet opening 205(*b*) may each be disposed in staggered arrangement along the circumferential direction C through the liner assembly 115. In various embodiments, the outlet openings 205 are defined generally parallel or co-directional to the longitudinal direction L through the liner assembly 115, such as depicted in regard to FIGS. 2-3.

In another exemplary embodiment, such as in regard to FIG. 12, one or more of the first outlet opening 205(*a*) or the second outlet opening 205(*b*) may be disposed at oblique angle 206 relative to the longitudinal direction L. In still various embodiments, the respective bodies 203(*a*), 203(*b*) may be disposed at the oblique angle 206 such as to dispose the respective outlet openings 205(*a*), 205(*b*) at the oblique angle 206. The oblique angle 206 of the outlet opening 205, the body 203, or both, may induce a bulk combustion swirl (e.g., along circumferential direction C) as the fuel-oxidizer mixture 186 egresses the fuel injector assembly 200 into the combustion chamber 62. The combustion swirl may enable a reduction in vane angle at the nozzle assembly 68 (FIG. 1) directly downstream of the combustor assembly 50, such as to reduce weight, part count, complexity, or reduce thermal loading at the nozzle assembly 68, thereby reducing an amount of cooling fluid necessary at the nozzle assembly 68. As such, combustion efficiency and engine efficiency are increased via reducing an amount of oxidizer utilized for cooling purposes specifically, or purposes aside from thrust generation generally.

Referring briefly to FIGS. 6-7, exemplary embodiments of the combustion section 100 defining an annular combustor relative to the centerline axis 12 are generally depicted. FIG. 6 provides a circumferential flowpath view of the combustion section 100 including the fuel injector assembly 200. FIG. 7 provides a detailed cross sectional view of the fuel injector assembly 200 coupled to the outer casing 64 and the liner assembly 115. In various embodiments the first direction 91 may correspond to a tangential direction relative to a circumferential direction C around the centerline axis 12, such as depicted in regard to FIGS. 6-7.

Referring still to FIGS. 6-7, in one embodiment, the body 203 defines the first inlet opening 221 through the first wall 231 and the second inlet opening 222 through the second wall 232 each spaced apart from one another along the circumferential direction C, or a tangent thereof along the first direction 91. The body 203 defines within it the fuel-oxidizer mixing passage 207 between the first wall 231 and the second wall 232 in which the fuel-oxidizer mixing passage 207 is extended at least partially along the radial direction R in fluid communication with the combustion chamber 62. The first inlet opening 221 and the second inlet opening 222 are each defined at least partially along the circumferential direction C, or a tangent angle thereof, in fluid communication with the fuel-oxidizer mixing passage 207 extended at least partially along the radial direction R. The body 203 defines the outlet opening 205 at the fuel-oxidizer mixing passage 207 at the distal end 94 of the body 203, such as directly at the combustion chamber 62 through the liner assembly 115.

Referring still to FIGS. 6-7, in still various embodiments of the combustion section 100, the fuel-oxidizer mixing passage 207 is defined at an acute angle 96 relative to the radial direction R extended from the centerline axis 12. In one embodiment, the first wall 231 and the second wall 232 are each extended along the radial direction R and the circumferential direction C, such as at the acute angle 96 relative to the radial direction R. The fuel-oxidizer mixing passage 207 may be defined between the first wall 231 and the second wall 232 and disposed at the acute angle 96 relative to the radial direction R. The acute angle 96 is configured to beneficially provide the flow of oxidizer 181, 182 into the body 203 for mixing with a flow of liquid and/or gaseous fuel, shown schematically via arrows 185 (FIGS. 7 and 10) to produce and egress to the combustion chamber 62 a well-mixed fuel-oxidizer mixture 186. In various embodiments, the acute angle 96 is between approximately 15 degrees and approximately 75 degrees relative to the radial direction R. In one embodiment, the acute angle 96 is between approximately 25 degrees and approximately 65 degrees. In another embodiment, the acute angle 96 approximately 45 degrees, +/−10 degrees. In still various embodiments, the acute angle 96 is further configured to condition the flow of oxidizer at the pressure plenum 66 for cooling downstream components, such as the HP turbine 28 (FIG. 1).

The acute angle 96 of the body 203, or more particularly the first wall 231 and the second wall 232, may induce a bulk combustion swirl (e.g., along circumferential direction C, or a tangent thereof) as the fuel-oxidizer mixture 186 egresses the fuel injector assembly 200 into the combustion chamber 62. The combustion swirl may enable a reduction in vane angle at the nozzle assembly 68 (FIG. 1) directly downstream of the combustor assembly 50, such as to reduce weight, part count, complexity, or reduce thermal loading at the nozzle assembly 68, thereby reducing an amount of cooling fluid necessary at the nozzle assembly 68, such as described above.

Referring now to FIGS. 8-10, in various embodiments, the first inlet opening 221 and the second inlet opening 222 each define an inlet passage 223 in fluid communication with the fuel-oxidizer mixing passage 207 and each of the first inlet opening 221 and the second inlet opening 222. The inlet passages 223 respective to each of the first inlet opening 221 and the second inlet opening 222 are generally disposed opposite of one another relative to the first direction 91 and each provide fluid communication to the fuel-oxidizer mixing passage 207. The inlet passages 223 enable respective flows of oxidizer 181, 182 to flow to the fuel-oxidizer mixing passage 207.

In various embodiments, the inlet passage 223 is disposed at an acute angle 97 relative to the second direction 92 or the first direction 91, such as depicted in regard to FIG. 10. In one embodiment, such as depicted in regard to FIG. 7, the inlet passage 223 is disposed at least partially along the circumferential direction C, or a tangential direction thereof, and along the radial direction R, such as along the acute angle 97. It should be appreciated that the acute angle 97 may differ relative to the first inlet opening 221 and the second inlet opening 222, such as generally depicted in regard to FIG. 7. In still various embodiments, the first inlet opening 221 and the second inlet opening 222, and the respective inlet passages 223, are disposed opposite of one another along the first direction 91.

In further embodiments, such as depicted in regard to FIGS. 7-8 and FIG. 10, the body 203 further defines a fuel passage 209 extended in fluid communication with the fuel-oxidizer mixing passage 207. The fuel passage 209 is configured to provide a flow of liquid and/or gaseous fuel 185 to the fuel-oxidizer mixing passage 207. In various embodiments, the fuel passage 209 is extended along the second direction 92 upstream of the fuel-oxidizer mixing passage 207 (i.e., from distal end 95 toward the fuel-oxidizer mixing passage 207).

In one embodiment, the body 203 defines a fuel passage exit opening 219 directly between the first inlet opening 221 and the second inlet opening 222 along the first direction 91. In one particular embodiment, such as depicted in regard to FIG. 7, the fuel passage exit opening 219 is defined between the first inlet opening 221 and the second inlet opening 222 along the circumferential direction C, or a tangent thereof. In more particular embodiments, the fuel passage exit 219 is disposed between respective inlet passages 223 of the first inlet opening 221 and the second inlet opening 222 along the first direction 91. The flows of oxidizer 181, 182 through the respective first inlet opening 221 and second inlet opening 222 mix with the flow of fuel 185 egressing the fuel passage 209 via the fuel passage exit opening 219. The flows of oxidizer 181, 182 and the flow of fuel 185 together mix within the fuel-oxidizer mixing passage 207 to produce the well-mixed fuel-oxidizer mixture 186 to the combustion chamber 62. The arrangement of the inlet openings 221, 222 across from one another relative to the first direction 91, and the fuel passage 209 disposed therebetween, may beneficially provide improved mixing via a shearing effect at the intersection of the inlet passages 223 and the fuel passage exit opening 219 at the fuel-oxidizer mixing passage 207.

Figure 4:
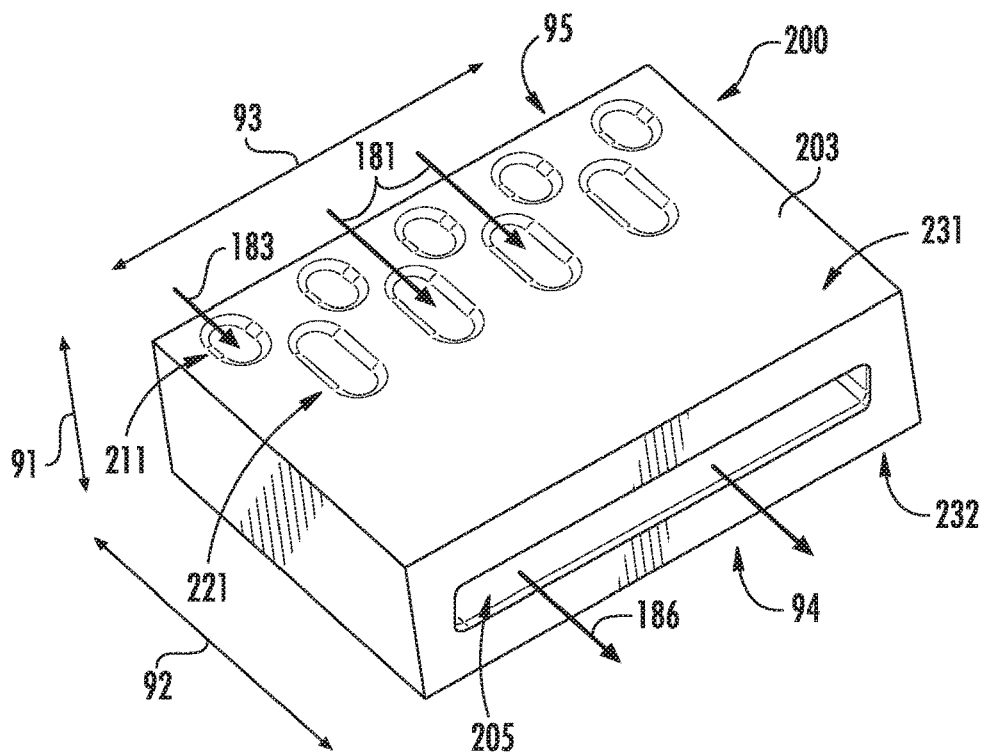
FIGS. 4-5 are perspective views of embodiments of the fuel injector assembly according to aspects of the present disclosure.

Referring back to FIGS. 2-5 and FIGS. 8-10, in various embodiments the body further defines a third inlet opening 211, 212 through one or more of the first wall 231 or the second wall 232. Referring to FIGS. 4-5, the first wall 231 may define the third inlet opening 211 therethrough and the second wall 232 may define the third inlet opening 212 therethrough opposite of the third inlet opening 211 through the first wall 231. The third inlet opening 211, 212 is in fluid communication with the fuel-oxidizer mixing passage 207. The third inlet opening 211, 212 is configured to provide a flow of oxidizer, shown schematically via arrows 183 (FIGS. 4-5, FIGS. 9-10) to the fuel-oxidizer mixing passage 207.

Referring more clearly to FIGS. 4-5 and FIGS. 8-10, in various embodiments the third inlet opening 211, 212 is disposed adjacent or otherwise next to one or more of the first inlet opening 221, the second inlet opening 222, or both along the second direction 92. In one embodiment, the third inlet opening 211, 212 is disposed toward a distal end 95 relative to the outlet opening 205 (i.e., opposite of the outlet opening 205 relative to the second direction 92). For example, the third inlet opening 211, 212 may be disposed upstream of the first inlet opening 221, the second inlet opening 222, or both. However, it should be appreciated that in other embodiments not depicted, the third inlet opening 211, 212 may be disposed downstream of one or more of the first inlet opening 221, the second inlet opening 222, or both.

In still further embodiments, the body 203 of the fuel injector assembly 200 defines a third inlet passage 213 extended at least partially along the first direction 91, such as depicted in FIGS. 8-9. The third inlet passage 213 is extended at least partially along the first direction 91 to provide fluid communication from each of the third inlet opening 211, 212 to the fuel-oxidizer mixing passage 207. Referring to FIGS. 9-10, it should be appreciated that the third inlet passage may be disposed upstream of the fuel passage exit opening 219 through which the flow of fuel 185 is provided to the fuel-oxidizer mixing passage 207.

Referring now to FIGS. 8-10, in various embodiments the body 203 includes a third wall 233 extended at least partially along the second direction 92. In one embodiment, the fuel passage 209 is defined through the third wall 233. In still various embodiments, the third inlet passage 213 is defined between a pair of the third wall 233. In one particular embodiment, the third inlet passage 213 is defined between a pair of the third wall 233 along the third direction 93, such as depicted in regard to FIG. 8.

In various embodiments, the body 203 defines a plurality of first inlet openings 221 and second inlet openings 222 each in adjacent or otherwise side-by-side arrangement along the third direction 93, such as depicted in regard to FIGS. 4-5 and FIG. 8. In one embodiment, the body 203 further defines a plurality of third inlet openings 211 through the first wall 231 between the first inlet openings 221 relative to the third direction 93. In still another embodiment, the body 203 further defines a plurality of the third inlet openings 212 through the second wall 232 between the second inlet openings 222 relative to the third direction 93. Various embodiments of the body 203 may further define a plurality of fuel passages 209 in adjacent or serial arrangement along the third direction 93, such as depicted in regard to FIG. 8.

Referring still to FIGS. 8-10, in various embodiments, each third inlet opening 211 through the first wall 231 is separated from the first inlet opening 221 by the third wall 233 extended at least partially along the second direction 92. In still various embodiments, each third inlet opening 212 through the second wall 232 is separated from the second inlet opening 222 by the third wall 233 extended at least partially along the second direction 92.

Figure 13:
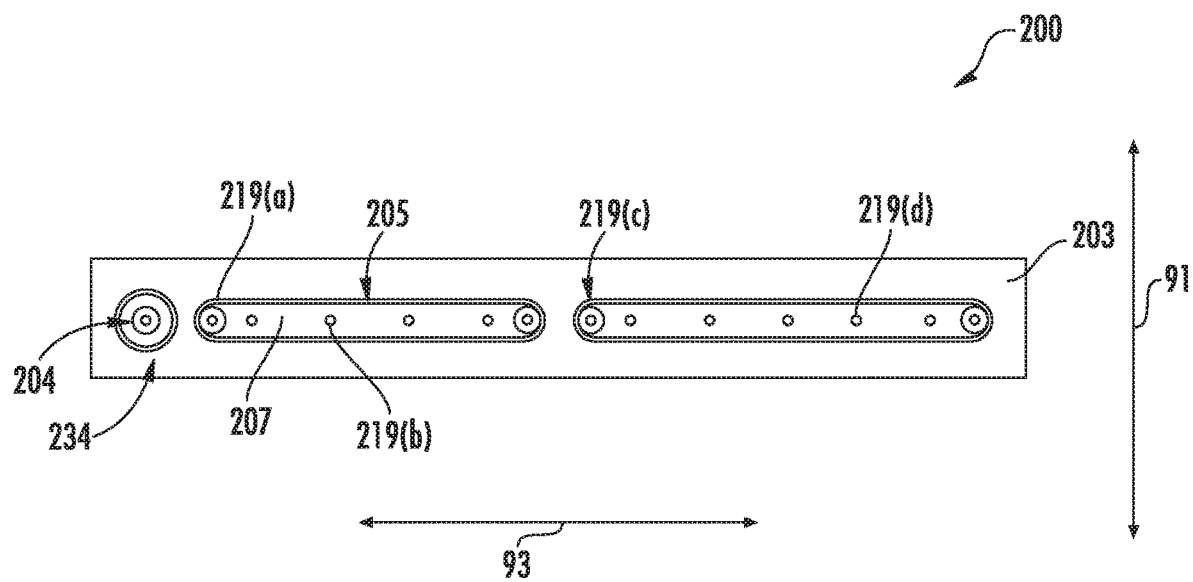
FIG. 13 is a flowpath view of an embodiment of the fuel injector assembly through the fuel-oxidizer mixing passage.

Referring now to FIG. 13, a flowpath view of another embodiment of the fuel injector assembly 200 is further provided. Referring back to FIGS. 2-3, FIGS. 11-12, in conjunction with FIG. 13, in various embodiments, the fuel injector assembly 200 may further define a fourth passage 204 extended therethrough in fluid communication with the combustion chamber 62 (FIGS. 2-3). In various embodiments, the fourth passage 204 is extended at least partially along the second direction 92. In one embodiment, the fourth passage 204 is configured to provide a flow of fuel, depicted schematically via arrows 187 (FIGS. 2-3), therethrough directly to the combustion chamber 62. A fourth wall 234 may be extended along the second direction 92 such as to fluidly separate the fourth passage 204 and the fuel-oxidizer mixing passage 207. In various embodiments, the fourth passage 204 may define a pilot fuel flow passage to promote light-off and low power operation of the combustion section 100. The fourth passage 204 may further independently control the flow of fuel 187 relative to the flow(s) of fuel 185 to the fuel-oxidizer mixing passage 207. As such, the fourth passage 204 may further be utilized to control heat release characteristics (e.g., pressure fluctuations, oscillations, etc.) at the combustion chamber 62, such as to mitigate undesired combustion dynamics.

In still another embodiment, the fourth passage 204 may provide an opening through which an igniter or a sensor is disposed through the body 203 to the combustion chamber 62. Sensors may include pressure sensors, such as to monitor or measure pressure at the combustion chamber, or fluctuations or oscillations thereof, or thermocouples, or visual or thermal imaging devices. Still other embodiments may enable borescope access through the body 203 and into the combustion chamber 62 via the fourth passage 204. Still other embodiments may define the fourth passage 204 as a damper, such as, for example, a Helmholtz damper. Still various embodiments may enable a sensor disposed through the fourth passage 204 such as to provide feedback control to the fuel system 300 and the engine 10, such as to adjust one or more flows of fuel 185 (e.g., independent control of flow of fuel 185(*a*), 185(*b*), etc., such as depicted in FIG. 2).

Referring back to FIG. 13, the fuel injector assembly 200 may further define the plurality of fuel passages 209 (not depicted) and fuel passage exit openings 219 of various geometries (depicted schematically via openings 219(*a*), 219(*b*), 219(*c*), 219(*d*), etc.), or flows of fuel therethrough, of various pressures, flow rates, temperatures, etc. such as to vary heat release loading along the longitudinal dimension of the combustion section 100 based at least desired loading (e.g., full load, part load, etc.) or mission condition (e.g., light-off, idle, takeoff, climb, cruise, approach, reverse, or one or more transient conditions therebetween). For example, the varied fuel passage exit openings 219(*a*), 219(*b*), 219(*c*), 219(*d*), or varied flows of fuel 185(*a*), 185(*b*), etc. (FIG. 2) may beneficially affect emissions output, combustion dynamics (e.g., pressure fluctuations, acoustics, vibrations, etc.) based on loading or mission condition.

Figure 14:
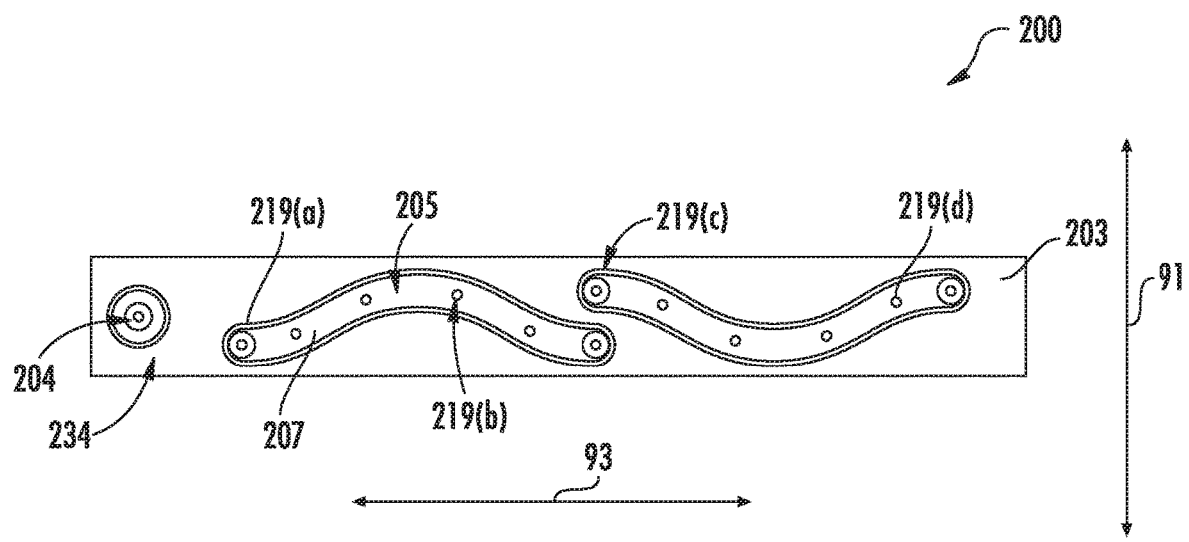
FIG. 14 is a flowpath view of an embodiment of the fuel injector assembly through the fuel-oxidizer mixing passage.

Referring now to FIG. 14, a flowpath view of yet another embodiment of the fuel injector assembly 200 is further provided. Referring back to FIGS. 2-3, FIGS. 11-13, in conjunction with FIG. 14, in various embodiments the fuel oxidizer mixing passage 207 and the outlet opening 205 may define a curved or serpentine cross sectional area. It should be appreciated that in other embodiments not depicted, the fuel oxidizer mixing passage 207 and/or the outlet opening 205 may define other cross sectional areas defining one or more waveforms, such as, but not limited to, a sine wave, a box wave, a triangle wave or zig-zag, or an asymmetric or irregular (e.g., variable frequency) waveform.

Referring back to FIG. 2, the engine 10 may include a fuel system 300 configured to receive the flow of liquid and/or gaseous fuel 185. The fuel system 300 may include one or more fuel metering devices 310, 320 such as to split and independently control the flow of fuel 185 such as to provide independent flows 185(*a*), 185(*b*) to the combustion section 100. In one embodiment, a first flow of fuel 185(*a*) may be received at first body 203(*a*) independent of a second flow of fuel 185(*b*) received at second body 203(*b*). As previously described, the flows of fuel 185(*a*), 185(*b*) may be independently metered, actuated, or otherwise provided to the fuel injector assembly 200 such as to beneficially alter heat release along the longitudinal direction L of the combustion section 100.

Embodiments of the engine 10 including the combustion section 100 and the fuel injector assembly 200 generally provided herein may provide more compact, shorter flames thereby enabling a more compact, shorter combustor assembly 50 and combustion section 100. As such, the engine 10 may be smaller (e.g., such as along the longitudinal direction L), thereby reducing weight, improving overall efficiency and performance, and enabling a relatively higher energy combustion section 100 to be installed in relatively smaller apparatuses.

In various embodiments, disposing the fuel injector assembly 200 directly into the outer liner 54 of the liner assembly 115 beneficially improves combustion performance, such as to enable a shorter distance between the outer casing 64 and the combustor assembly 50 along the radial direction R. For example, various embodiments of the fuel injector assembly 200 may define passages (e.g., passages 207, 209, 213, 223, etc.) substantially straight. Alternatively, some or all of the passages may define varying cross sectional areas, serpentine cross sections, or curvatures, etc. Additionally, or alternatively, a simplified fuel injector assembly 200 including a mixer or pre-mixer device may obviate turns, dog-legs, L-cross sections, etc. that increase mechanical, aero/thermal, or manufacturing complexity, or further reducing thermal loading relative to conventional fuel nozzle assemblies, thereby improving durability and mitigating coking or losses relative to utilizing air or fuel for cooling.

Embodiments of the fuel injector assembly 200 and the combustion section 100 may further lower emissions (e.g., oxides of nitrogen, or $NO_x$) and reduce flame radiation from premixing through the outer liner 54 of the liner assembly 115. Fuel staging, such as via independent flows of fuel 185(*a*), 185(*b*), or more (e.g., three or more independent flows across the longitudinal direction L) may provide higher combustion efficiency over ambient conditions, engine load range, and mission conditions.

In particular embodiments, the combustion section 100 may include the fuel injector assemblies 200 defining the first body 203(a) axially separated from the second body 203(b) to provide sequential axial staging of combustion in two or more zones, such as to increase firing temperature at a base load or other part-load condition and decreasing NOx formation. The part-load condition of the engine 10 may enable decreased or eliminated fuel flow at the second body 203(b) such as to maintain operability at part-load conditions while further enabling decreased emissions output (e.g., NOx), fuel burn, and maintaining or improving part-load operability. Additionally, or alternatively, the sequential axial staging may enable improved efficiency at high power or full-load conditions, such to provide fuel through the first body 203(a) and the second body 203(b) or more. Still further, sequential axial staging may enable control and improvement of combustion dynamics, such as by independently and selectively flowing fuel through the first body 203(a) and the second body 203(b).

Still further, or alternatively, the fuel injector assembly 200 disposed substantially straight through the outer casing 64 through the liner assembly 115 (e.g., the outer liner 54) may reduce internal fuel coking via reduced thermal loading due to the shorter, substantially straight passages in contrast to conventional fuel nozzles.

Still various embodiments of the fuel injector assembly 200 and combustion section 100 may create bulk combustion swirls (e.g., along the circumferential direction C or a tangent thereof) that may reduce a swirl angle at the turbine nozzle assembly 68, or obviate the nozzle assembly altogether, thereby reducing weight of the engine 10, reducing cooling flows, and improving engine efficiency and performance.

Furthermore, embodiments of the fuel injector assembly 200 and combustion section 100 may provide relatively easier installation by obviating concerns arising from offsets, alignments, placements, positioning, etc. relative to swirler assemblies through which conventional fuel nozzles may be disposed.

Figure 15:
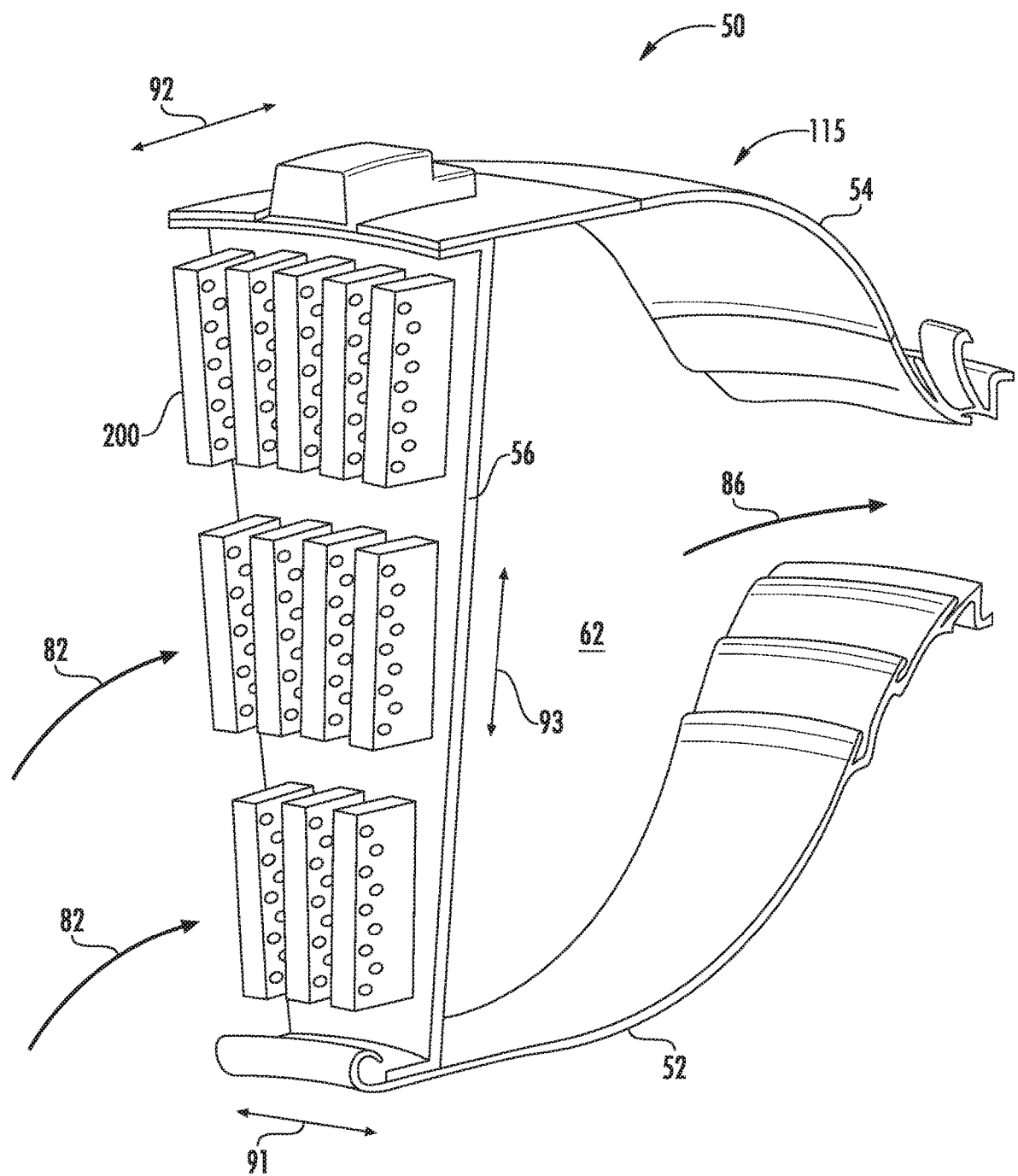
FIG. 15 is an aft looking forward perspective view of an embodiment of a portion of the combustion section and fuel injector assembly of the heat engine of FIG. 1.
Figure 16:
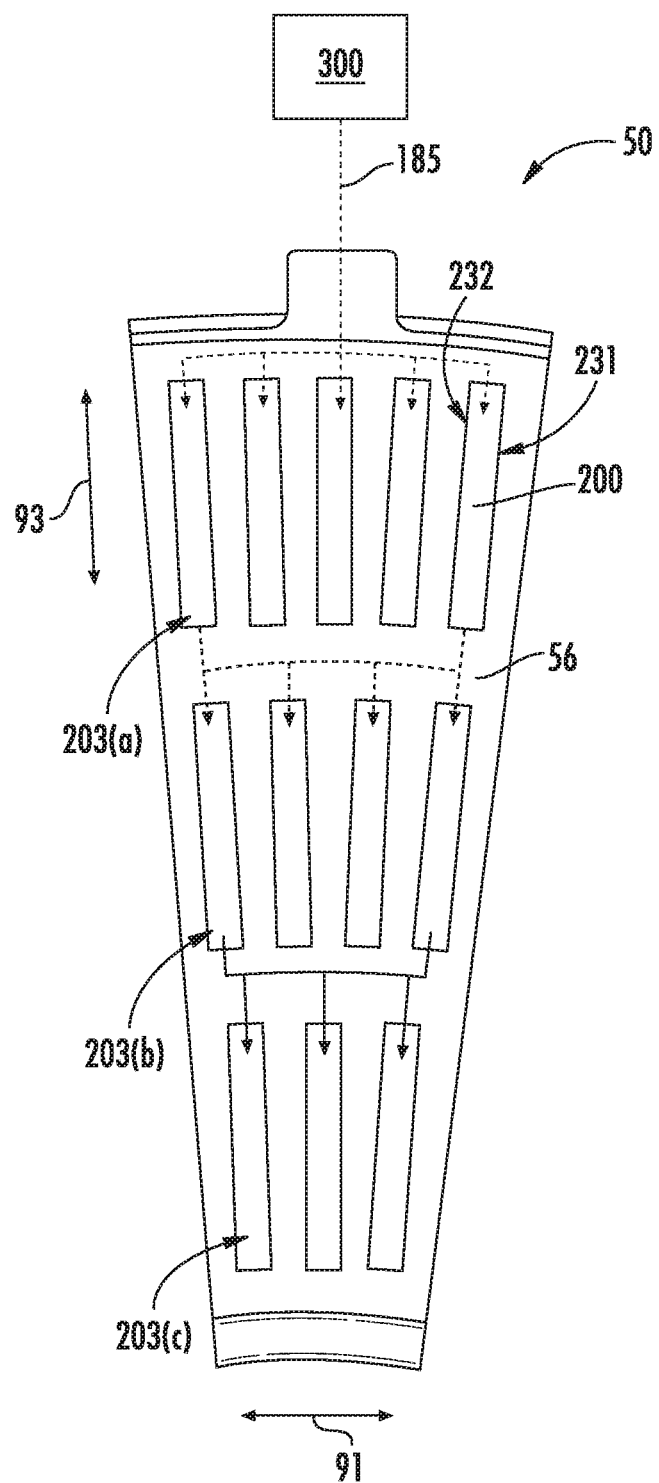
FIG. 16 is an aft looking forward flowpath view of the embodiment of the combustion section and fuel injector assembly provided in regard to FIG. 15.
Figure 17:
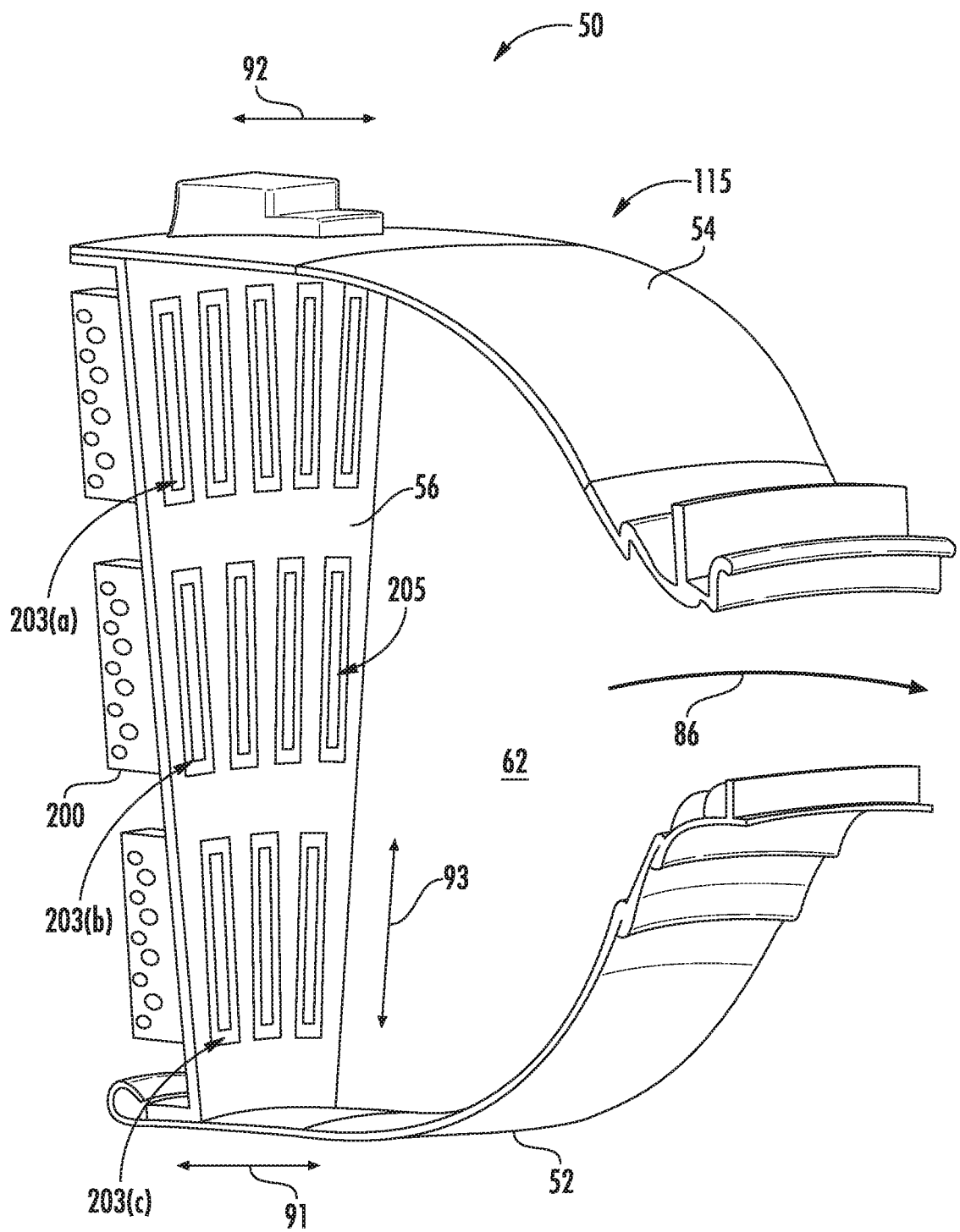
FIG. 17 is a forward looking aft perspective view of an embodiment of the portion of the combustion section and fuel injector assembly provided in regard to FIGS. 14-16.

Referring now to FIGS. 15-17, exemplary embodiments of a portion of the combustion section 100 including the fuel injector assembly 200 of the heat engine 10 of FIG. 1 are further provided. In the exemplary embodiments generally provided, a plurality of fuel injector assemblies 200 may be positioned in adjacent arrangement along the first direction 91. In still exemplary embodiments, the plurality of fuel injector assemblies 200 may be position in adjacent arrangement along the third direction 93. For example, the third direction 93 may correspond to a radial direction of the engine 10 (FIG. 1). In still another example, the first direction 91 may correspond to a circumferential direction of the engine 10 (FIG. 1).

In various embodiments, the plurality of fuel injectors 200 may include a first body 203(a), a second body 203(b), and a third body 203(c). Each of the bodies 203(a), 203(b), 203(c) may each define different geometry, fuel flow outputs (e.g., pressure, flow rate, temperature, liquid and/or gaseous fuel type, etc.), or other characteristics affecting heat release at the combustion chamber 62. For example, referring to FIGS. 16-17, the combustion section 100 may include the plurality of fuel injectors 200 defining the first body 203(a) at a first row (e.g., corresponding to a first circumferential row) separated from the second body 203(b) at a second row (e.g., corresponding to a second circumferential row) and the third body 203(c) at a third row (e.g., corresponding to a third circumferential row) each separated along the third direction 93 (e.g., corresponding to a radial direction of the combustion section).

The fuel system 300 may be coupled to each circumferential sector of fuel injectors 200, such as the portion depicted in regard to FIGS. 15-17. The fuel system 300 may provide one or more flows of fuel 185 to the plurality of fuel injectors 200. Although depicted as a single flow of fuel 185, it should be appreciated that the fuel system 300 may include two or more fuel metering devices (e.g., fuel metering device 310, 320 depicted in FIG. 2) to provide two or more independently controlled flows of liquid and/or gaseous fuel to each of the bodies 203(a), 203(b), 203(c) of the plurality of fuel injectors 200.

Although not further depicted herein, the fuel injector assembly 200 and the combustion section 100 may include one or more seals, such as between the fuel injector assembly 200 and the outer casing 64, or between the fuel injector assembly 200 and the liner assembly 115 (e.g., at the outer liner 54), etc.

The fuel injector assembly 200, the combustion section 100, and the combustor assembly 50 depicted in regard to FIGS. 1-17 and described herein may be constructed as an assembly of various components that are mechanically joined or arranged such as to produce the fuel injector assembly 200 shown and described herein. The fuel injector assembly 200, the combustion section 100, and the combustor assembly 50, or portions thereof, may alternatively be constructed as a single, unitary component and manufactured from any number of processes commonly known by one skilled in the art. For example, the fuel injector assembly 200 and the outer casing 64 may be constructed as a single, unitary component. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel injector assembly 200 or the combustion section 100. Furthermore, the fuel injector assembly 200 may be constructed of any suitable material for turbine engine combustor sections, including but not limited to, nickel- and cobalt-based alloys. Still further, flowpath surfaces and passages may include surface finishing or other manufacturing methods to reduce drag or otherwise promote fluid flow, such as, but not limited to, tumble finishing, barreling, rifling, polishing, or coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustion section for a heat engine, the combustion section defining a longitudinal direction co-directional to a centerline axis, a radial direction extended from the centerline axis, a circumferential direction around the centerline axis, and a tangential direction relative to the radial direction and the circumferential direction, the combustion section comprising:

an outer casing extended along the longitudinal direction;

a liner assembly disposed inward of the outer casing along the radial direction, and wherein the liner assembly is extended along the longitudinal direction, the liner assembly defining a combustion chamber therewithin, and wherein a pressure plenum is defined around the liner assembly inward of the outer casing;

a plurality of fuel injector assemblies, each of the plurality of fuel injector assemblies comprising:

a body coupled to the outer casing and the liner assembly, wherein the body is extended at least partially through the liner assembly in fluid communication with the combustion chamber, and wherein the body is extended along the longitudinal direction and coupled to the liner assembly along the longitudinal direction, and wherein the body comprises a first wall and a second wall spaced apart from one another along the circumferential direction, and wherein the body defines a first inlet opening through the first wall and a second inlet opening through the second wall each spaced apart from one another along the circumferential direction, and further wherein the body defines a fuel-oxidizer mixing passage therewithin between the first wall and the second wall, wherein the fuel-oxidizer mixing passage is extended at least partially along the radial direction and is in fluid communication with the combustion chamber, and wherein the first inlet opening and the second inlet opening are each in fluid communication with the fuel-oxidizer mixing passage, and further wherein the body defines an outlet opening at the fuel-oxidizer mixing passage at a distal end relative to the first inlet opening and the second inlet opening and through the liner assembly, wherein the first inlet opening and the second inlet opening are each configured to admit a flow of oxidizer from the pressure plenum to the fuel-oxidizer mixing passage, and wherein the fuel-oxidizer mixing passage is configured to provide a flow of fuel-oxidizer mixture to the combustion chamber via the outlet opening, wherein the plurality of fuel injector assemblies are arranged in adjacent longitudinal arrangement with one another.

2. The combustion section of claim 1, wherein the body defines the outlet opening extended at least partially along the longitudinal direction.

3. The combustion section of claim 2, wherein the body defines the outlet opening as a slot in direct fluid communication with the combustion chamber, and wherein the outlet opening is extended along the longitudinal direction through the liner assembly.

4. The combustion section of claim 1, wherein the plurality of fuel injector assemblies are further arranged in circumferential arrangement with one another in the circumferential direction around the centerline axis.

5. The combustion section of claim 4, wherein the plurality of bodies are staggered along the circumferential direction.

6. The combustion section of claim 4, wherein one or more of the plurality of bodies is disposed at an oblique angle relative to the longitudinal direction.

7. The combustion section of claim 1, wherein the plurality of fuel injector assemblies are arranged through the liner such that their respective fuel-oxidizer mixing passage is defined at an acute angle relative to the radial direction extended from the centerline axis.

8. The combustion section of claim 1, wherein the body further defines a third inlet opening through one or more of the first wall or the second wall, wherein the third inlet opening is in fluid communication with the fuel-oxidizer mixing passage, wherein the third inlet opening is configured to provide a flow of oxidizer from the pressure plenum to the fuel-oxidizer mixing passage, and wherein the third inlet opening is arranged, in the longitudinal direction, either upstream or downstream, of the first inlet opening through the first wall, and/or either upstream or downstream of the second inlet opening through the second wall.

9. The combustion section of claim 1, wherein the first wall and the second wall have a rectangular shape that is longer in the longitudinal direction than in the radial direction.

10. The combustion section of claim 8, wherein the plurality of fuel injector assemblies comprises a first fuel injector assembly and a second fuel injector assembly arranged, in the longitudinal direction, downstream of the first fuel injector assembly, wherein the body of the first fuel injector assembly further comprises a passage extending at least partially in the radial direction through the body and being in fluid communication with the outlet opening, the passage being separated from the fuel-oxidizer mixing passage.

11. The combustion section of claim 10, wherein the passage defines one of a pilot fuel flow passage, an igniter passage for accommodating an igniter or a sensor passage for accommodating a sensor.

12. The combustion section of claim 1, wherein the body defines a fuel passage exit opening directly between the a first inlet passage at the first inlet opening and the a second inlet passage at the second inlet opening, the first inlet passage, the second inlet passage and the fuel exit opening being in direct fluid communication with the fuel-oxidizer mixing passage.

13. The combustion section of claim 1, wherein the body further comprises a third wall extended at least partially along the radial direction between the first wall and the second wall, and wherein a fuel passage is defined through the third wall and is in fluid communication with the fuel-oxidizer mixing passage.

14. The combustion section of claim 13, wherein the body defines a plurality of first inlet openings through the first wall, and a plurality of second inlet openings through the second wall, each in adjacent arrangement with one another along the longitudinal direction, and wherein the body defines a plurality of third inlet openings through one or both of the first wall and the second wall, a respective third inlet opening among the plurality of third inlet openings being arranged between one or both of respective ones of the first inlet openings or respective ones of the second inlet openings, along the longitudinal direction.

15. The combustion section of claim 14, wherein the body defines a plurality of fuel passages in adjacent arrangement along the longitudinal direction.

16. The combustion section of claim 15, wherein the body defines a plurality of third inlet passages extended at least partially along the tangential direction and corresponding to a respective one of the plurality of third inlet openings, wherein each respective one of the plurality of third inlet passages is defined between a pair of the third wall.

17. The combustion section of claim 16, wherein each of the plurality of third inlet passages is disposed adjacent a fuel passage exit opening through which a flow of fuel is provided to the fuel-oxidizer mixing passage.

18. The combustion section of claim 1, wherein a fuel passage is extended through the outer casing and the body in fluid communication with the fuel-oxidizer mixing passage, wherein the fuel passage is configured to provide a flow of fuel to the fuel-oxidizer mixing passage.

19. The combustion section of claim 1, wherein the first wall and the second wall are each extended along the radial direction and the circumferential direction, and wherein the fuel-oxidizer mixing passage defined therebetween is disposed at an acute angle relative to the radial direction.

20. The combustion section of claim 19, wherein the acute angle is between approximately 25 degrees and approximately 75 degrees relative to the radial direction.

21. A combustion section for a heat engine, the combustion section defining a longitudinal direction co-directional to a centerline axis, a radial direction extended from the centerline axis, a circumferential direction around the centerline axis, and a tangential direction relative to the radial direction and the circumferential direction, the combustion section comprising:
 an outer casing extended along the longitudinal direction;
 a liner assembly disposed inward of the outer casing along the radial direction, and wherein the liner assembly is extended along the longitudinal direction, the liner assembly defining a combustion chamber therewithin, and wherein a pressure plenum is defined around the liner assembly inward of the outer casing;
 a body coupled to the outer casing and the liner assembly, wherein the body is extended at least partially through the liner assembly in fluid communication with the combustion chamber, and wherein the body is extended along the longitudinal direction and coupled to the liner assembly along the longitudinal direction, and wherein the body comprises a first wall and a second wall spaced apart from one another along the circumferential direction, and wherein the body defines a first inlet opening through the first wall and a second inlet opening through the second wall each spaced apart from one another along the circumferential direction, and further wherein the body defines a fuel-oxidizer mixing passage therewithin between the first wall and the second wall, wherein the fuel-oxidizer mixing passage is extended at least partially along the radial direction and is in fluid communication with the combustion chamber, and wherein the first inlet opening and the second inlet opening are each in fluid communication with the fuel-oxidizer mixing passage, and further wherein the body defines an outlet opening at the fuel-oxidizer mixing passage at a distal end relative to the first inlet opening and the second inlet opening and through the liner assembly, wherein the first inlet opening and the second inlet opening are each configured to admit a flow of oxidizer from the pressure plenum to the fuel-oxidizer mixing passage, and wherein the fuel-oxidizer mixing passage is configured to provide a flow of fuel-oxidizer mixture to the combustion chamber via the outlet opening,
wherein the body comprises a third wall extended at least partially along the radial direction and wherein a fuel passage is defined through the third wall,
wherein the body defines a plurality of first inlet openings and a plurality of second inlet openings each in adjacent arrangement along the longitudinal direction, and wherein the body defines a plurality of third inlet openings between one or both of the first inlet openings or second inlet openings, along the longitudinal direction, and
wherein the body defines a plurality of fuel passages in adjacent arrangement along the longitudinal direction.

* * * * *

UNITED STATES PATENT AND TRADEMARK OFFICE
CERTIFICATE OF CORRECTION

| | |
|---|---|
| PATENT NO. | : 11,286,884 B2 |
| APPLICATION NO. | : 16/217625 |
| DATED | : March 29, 2022 |
| INVENTOR(S) | : Gregory A. Boardman et al. |

It is certified that error appears in the above-identified patent and that said Letters Patent is hereby corrected as shown below:

In the Claims

Claim 1, Column 15, Lines 42-44, "wherein the plurality of fuel injector assemblies are arranged in adjacent longitudinal arrangement with one another." should be -- wherein the plurality of fuel injector assemblies are arranged in direct adjacent longitudinal arrangement with one another. --

Signed and Sealed this
Nineteenth Day of July, 2022

Katherine Kelly Vidal
*Director of the United States Patent and Trademark Office*